United States Patent
Lee et al.

(10) Patent No.: US 10,917,920 B2
(45) Date of Patent: Feb. 9, 2021

(54) METHOD AND APPARATUS FOR CONNECTING ALTERNATIVE COMMUNICATION MEANS USING BLUETOOTH LOW ENERGY (LE)

(71) Applicant: LG ELECTRONICS INC., Seoul (KR)

(72) Inventors: Hyeonjae Lee, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/573,733

(22) PCT Filed: May 13, 2016

(86) PCT No.: PCT/KR2016/005119
§ 371 (c)(1),
(2) Date: Nov. 13, 2017

(87) PCT Pub. No.: WO2016/182404
PCT Pub. Date: Nov. 17, 2016

(65) Prior Publication Data
US 2018/0152979 A1    May 31, 2018

Related U.S. Application Data

(60) Provisional application No. 62/161,277, filed on May 14, 2015.

(51) Int. Cl.
*H04B 7/00* (2006.01)
*H04W 76/10* (2018.01)
(Continued)

(52) U.S. Cl.
CPC ............. *H04W 76/10* (2018.02); *H04W 4/80* (2018.02); *H04W 8/005* (2013.01);
(Continued)

(58) Field of Classification Search
CPC ....... H04W 76/10; H04W 76/30; H04W 4/00; H04W 8/00; H04W 72/0406; H04W 72/0453; H04W 52/0209
(Continued)

(56) References Cited

U.S. PATENT DOCUMENTS 8,780,961 B2 *  7/2014  Muth ................ H04W 52/0212
                                                    375/219
8,965,284 B2 *  2/2015  Honkanen ................ G01S 3/46
                                                    455/41.2
(Continued)

*Primary Examiner* — April G Gonzales
(74) *Attorney, Agent, or Firm* — Birch, Stewart, Kolasch & Birch, LLP

(57) ABSTRACT

The present invention relates to a method for transmitting and receiving data performed by a first device that receives service list information through Bluetooth Low Energy (LE). The present invention provides a method and apparatus including receiving an advertising message for discovering a second device from the second device, establishing a Bluetooth LE connection with the second device based on the advertising message, transmitting a first request message requesting connection information for establishing the Bluetooth BR/EDR connection with the second device through the Bluetooth LE, receiving a first response message including the connection information from the first device, and establishing a Bluetooth BR/EDR connection for providing a specific service with the second device.

12 Claims, 27 Drawing Sheets

(51) Int. Cl.
*H04W 8/00* (2009.01)
*H04W 76/30* (2018.01)
*H04W 4/80* (2018.01)
*H04W 72/04* (2009.01)
*H04W 52/02* (2009.01)

(52) U.S. Cl.
CPC ... *H04W 72/0406* (2013.01); *H04W 72/0453* (2013.01); *H04W 76/30* (2018.02); *H04W 52/0209* (2013.01); *Y02D 30/70* (2020.08)

(58) Field of Classification Search
USPC .................................................. 455/41.2
See application file for complete search history.

(56) References Cited

U.S. PATENT DOCUMENTS

| | | | | |
|---|---|---|---|---|
| 9,008,917 B2* | 4/2015 | Gautama | G07C 9/00309 | 701/48 |
| 2010/0035545 A1* | 2/2010 | Ibrahim | G06F 3/03541 | 455/41.2 |
| 2011/0021142 A1* | 1/2011 | Desai | H04W 8/005 | 455/41.2 |
| 2012/0052802 A1* | 3/2012 | Kasslin | H04W 48/12 | 455/41.2 |
| 2012/0195387 A1* | 8/2012 | Masuda | H04W 8/005 | 375/259 |
| 2012/0196534 A1* | 8/2012 | Kasslin | H04W 4/06 | 455/41.2 |
| 2012/0317194 A1* | 12/2012 | Tian | H04W 8/005 | 709/204 |
| 2013/0182798 A1* | 7/2013 | Lozano | H04W 4/18 | 375/340 |
| 2013/0194968 A1* | 8/2013 | Masuda | H04W 48/18 | 370/254 |
| 2013/0288600 A1* | 10/2013 | Kuusilinna | H02J 7/00036 | 455/41.2 |
| 2013/0309971 A1* | 11/2013 | Kiukkonen | H04W 12/003 | 455/41.2 |
| 2013/0331031 A1* | 12/2013 | Palin | H04W 8/005 | 455/41.2 |
| 2014/0057567 A1* | 2/2014 | Desai | H04W 8/005 | 455/41.2 |
| 2014/0059235 A1* | 2/2014 | Palin | H04W 76/14 | 709/227 |
| 2014/0073252 A1* | 3/2014 | Lee | H04M 1/72522 | 455/41.2 |
| 2014/0154986 A1* | 6/2014 | Lee | H04W 4/80 | 455/41.2 |
| 2014/0154987 A1* | 6/2014 | Lee | H04W 76/11 | 455/41.2 |
| 2014/0155050 A1* | 6/2014 | Choi | H04W 4/80 | 455/418 |
| 2014/0157135 A1* | 6/2014 | Lee | H04W 4/70 | 715/738 |
| 2014/0188348 A1* | 7/2014 | Gautama | B60W 10/30 | 701/48 |
| 2014/0194062 A1* | 7/2014 | Palin | H04W 8/005 | 455/41.2 |
| 2014/0194082 A1* | 7/2014 | Wingert | H04W 76/50 | 455/404.1 |
| 2014/0273858 A1* | 9/2014 | Panther | A61B 5/4812 | 455/41.2 |
| 2014/0323048 A1* | 10/2014 | Kang | H04W 76/14 | 455/41.2 |
| 2014/0355517 A1* | 12/2014 | Reunamaki | H04W 8/005 | 370/328 |
| 2014/0370811 A1* | 12/2014 | Kang | H04W 84/18 | 455/41.2 |
| 2014/0378058 A1* | 12/2014 | Decuir | H04W 4/80 | 455/41.2 |
| 2015/0163748 A1* | 6/2015 | Hrabak | H04W 52/0245 | 455/41.2 |
| 2015/0172901 A1* | 6/2015 | Kasslin | H04W 8/005 | 370/328 |
| 2015/0223013 A1* | 8/2015 | Park | H04W 4/80 | 455/41.2 |
| 2015/0289124 A1* | 10/2015 | Palin | H04W 8/005 | 455/41.2 |
| 2015/0296073 A1* | 10/2015 | Lo | H04W 52/0235 | 455/41.2 |
| 2015/0319674 A1* | 11/2015 | Hughes | H04W 8/005 | 455/41.2 |
| 2015/0351008 A1* | 12/2015 | Mayor | G01S 5/02 | 455/41.2 |
| 2015/0373749 A1* | 12/2015 | Palin | H04W 4/80 | 455/41.2 |
| 2016/0007181 A1* | 1/2016 | Palin | H04B 17/10 | 455/41.2 |
| 2016/0100275 A1* | 4/2016 | Viswanadham | H04L 45/7457 | 455/41.2 |
| 2016/0157078 A1* | 6/2016 | Palin | H04W 4/80 | 455/41.2 |
| 2016/0192115 A1* | 6/2016 | Weiss | H04W 84/18 | 455/41.2 |

* cited by examiner

Dual Mode Architecture

Fig.12
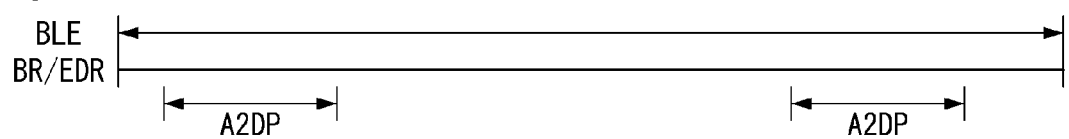
(a) Audio streaming
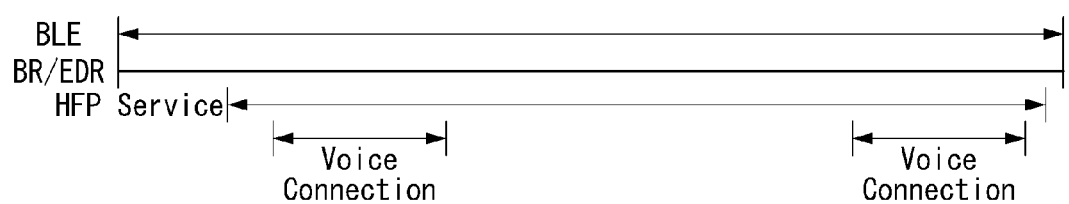
(b) Hands-free

Fig.17

| | Length(1octet) | AD type(1octet) | AD data(9octets) |
|---|---|---|---|
| Sample | 0x0A | 0x2A(TBD) | Below table |
| Description | 10 octets | <<Service Discovery Data>> | Organization Frame |

| | Supported Carriers (1octet) | Organization ID (1octet) | SDS Flags (1octet) | Length (1octet) | Organization Data (4octet) |
|---|---|---|---|---|---|
| Sample | 0b 10000000? | 0x 01 | 0b 10101000 | 0x 04 | 0x110B111E |
| Description | Bit0: Bluetooth SIG(1)<br>Bit1: Wi-Fi Alliance(0)<br>RFU: (0/5)<br>Bit7: Additional Carrier Filed follows | Bluetooth SIG: 0x 01 | Bit0: Provider(1)<br>Bit1: Scanning Disabled(0)<br>Bit2: Additional Data in GATT(0 or 1)<br>Bit3~4: On and Available(01)<br>Bit5~7: RFU | 4 | A2DP Sink(0x110B)<br>HFP HandFree(0x111E) |

Fig.18

|  | Length(1 octet) | AD type(1 octet) | AD data(11 octets) |
|---|---|---|---|
| Sample | 0x0C | 0x09 | 0x 52 61 73 70 62 65 72 72 79 50 69 |
| Description | Length 12 octets | <<Complete Local Name>> | Raspberrypi |

(a) Device name

|  | Length(1 octet) | AD type(1 octet) | AD data(3 octets) |
|---|---|---|---|
| Sample | 0x04 | 0x0D | 0x 200418 (headphone) |
| Description | Length 4 octets | <<Class of Device>> | Major Service Class<br>Major Device Class<br>Minor Device Class Filed |

(b) Device type

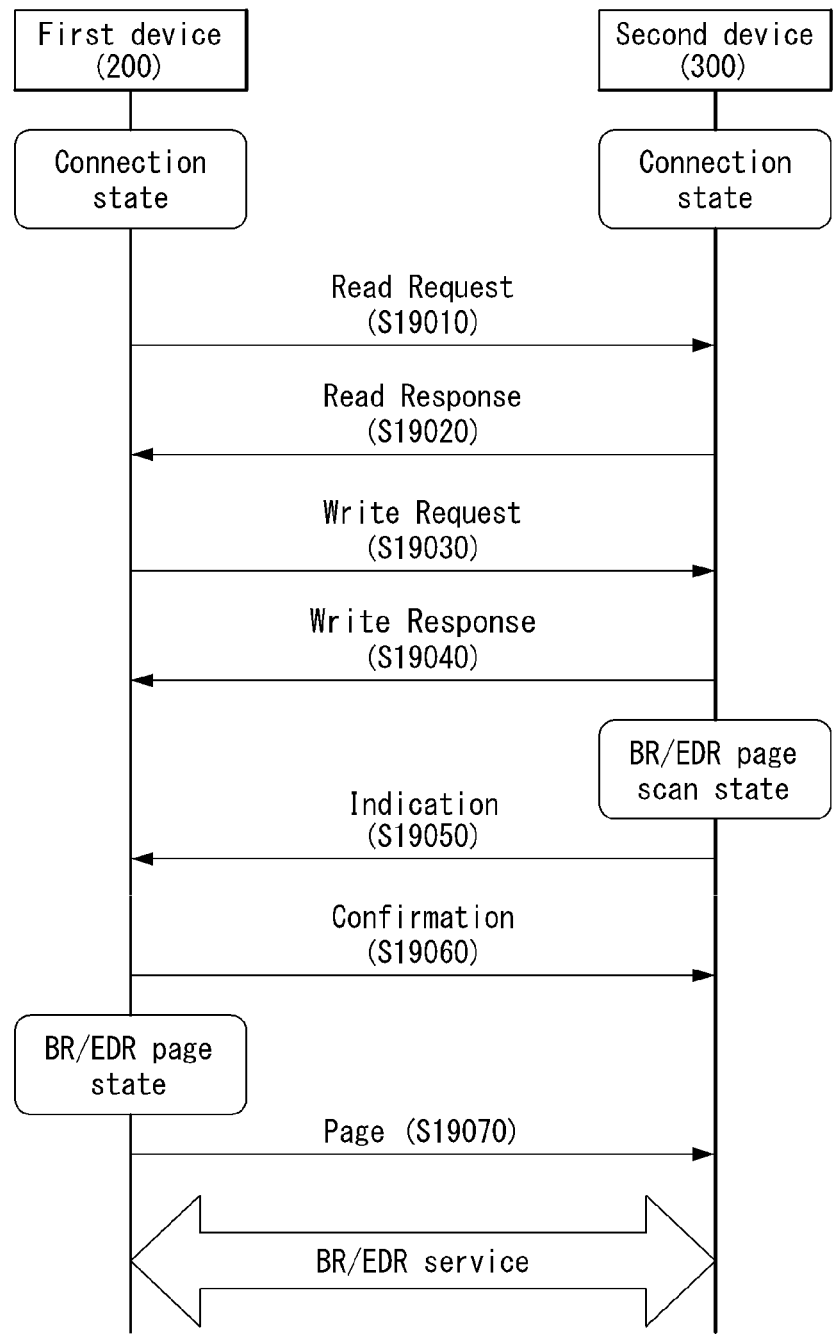

Fig.20

| Specification Name | Specification Type | Assigned Number |
|---|---|---|
| Generic Access | org.bluetooth.service.generic_access | 0x 1800 |
| Generic Attribute | org.bluetooth.service.generic_attribute | 0x 1800 |
| Tx Power | org.bluetooth.service.tx_power | 0x 1804 |
| Service Discovery | org.bluetooth.service.service_discovery | 0x 1877 (TBD) |

(a) Service

| Specification Name | Assigned Number | Properties | Interface | Parameter Example |
|---|---|---|---|---|
| HID Control Point (example) | 0x 2A4C (example) | Write (example) | — | — |
| Handover Control Point | 0x 88a5 (TBD) | Write | All | Organization Specific data up to 19byte BR/EDR A2DP or HFP |
| BD_ADDR (6byte) | 0x 77a1 (TBD) | Read | BR/EDR | 08:EF:3B:B0:11:32 (Bluetooth Dongle) |
| Class of Device (3byte) | 0x 77a2 (TBD) | Read | BR/EDR | Projecto |
| Clock Offset | 0x 77a3 (TBD) | Read | BR/EDR | |

(b) Characteristic

Fig.21

|  | Op Code | Parameter |
|---|---|---|
| Octet Order | N/A | LS0...MS0 |
| Data type | uint8 | Variable |
| Size | 1 octet | 0 to 20 octets |
| Units | None | None |

(a) Write request

| Op Code value | Procedure | Require-ment | Parameter | Applicable Response Value | Response Parameter |
|---|---|---|---|---|---|
| 0x00 | Reserved for Future Use | | | | |
| 0x01 | Activate Alternate Transport | M | This field shall contain the relevant 1 octets Organization ID followed by Organization-specific data up to 19 octets. | This shall contain one of the following response values : Op Code Not Supported, Invalid Parameter, Procedure Not Permitted, Operation Failed, Success | This field shall contain the relevant 1 octet Organization ID followed by Organization-specific data up to 19 octets. |
| 0x02-0x1F | Reserved for Future Use | | | | |
| 0x20 | Response Code | M | Response Value (see Table 3.4) | N/A | N/A |
| 0x21-0xFF | Reserved for Future Use | | | | |

(b) Op Code

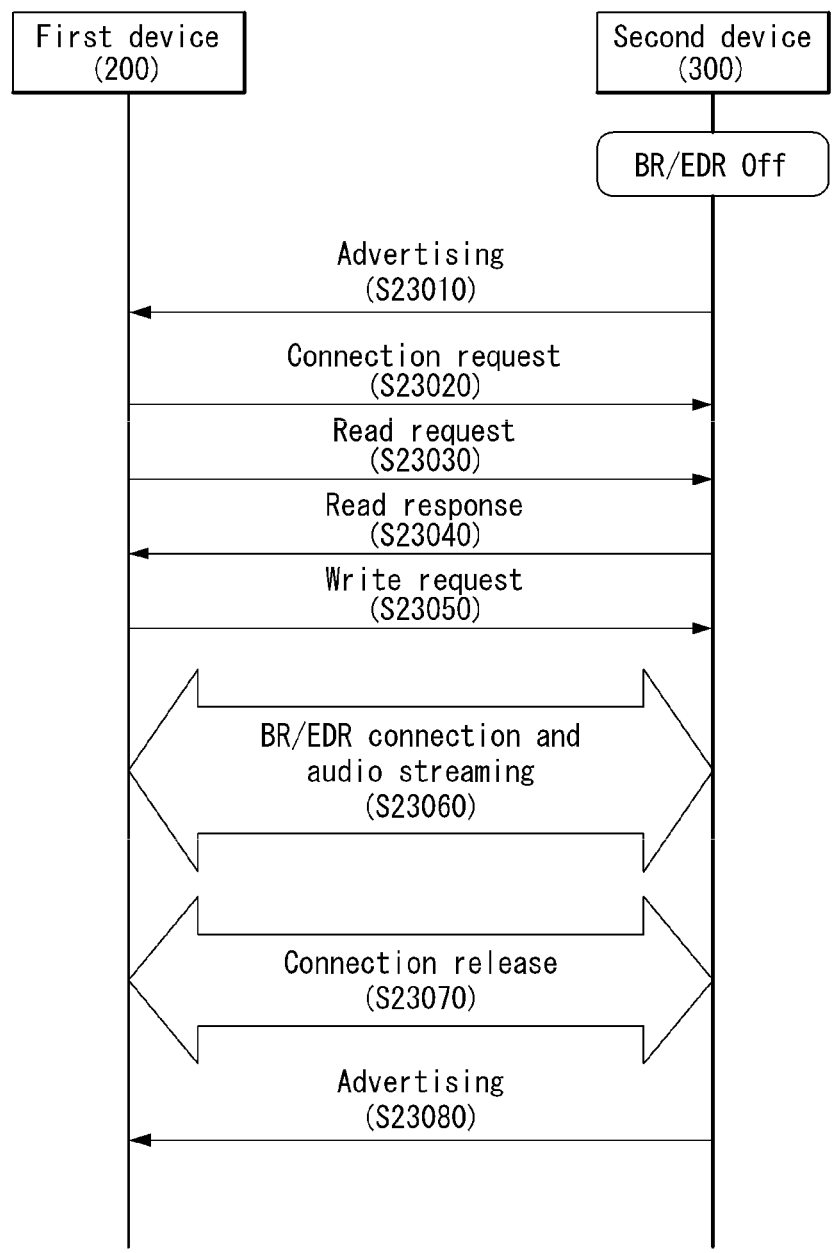

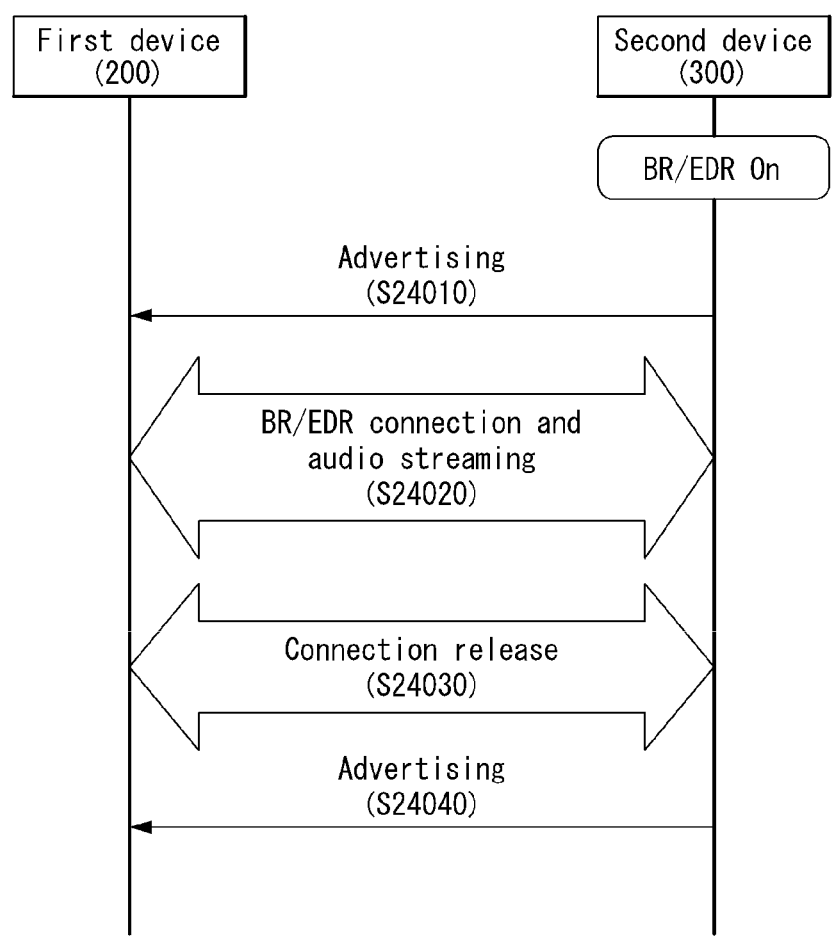

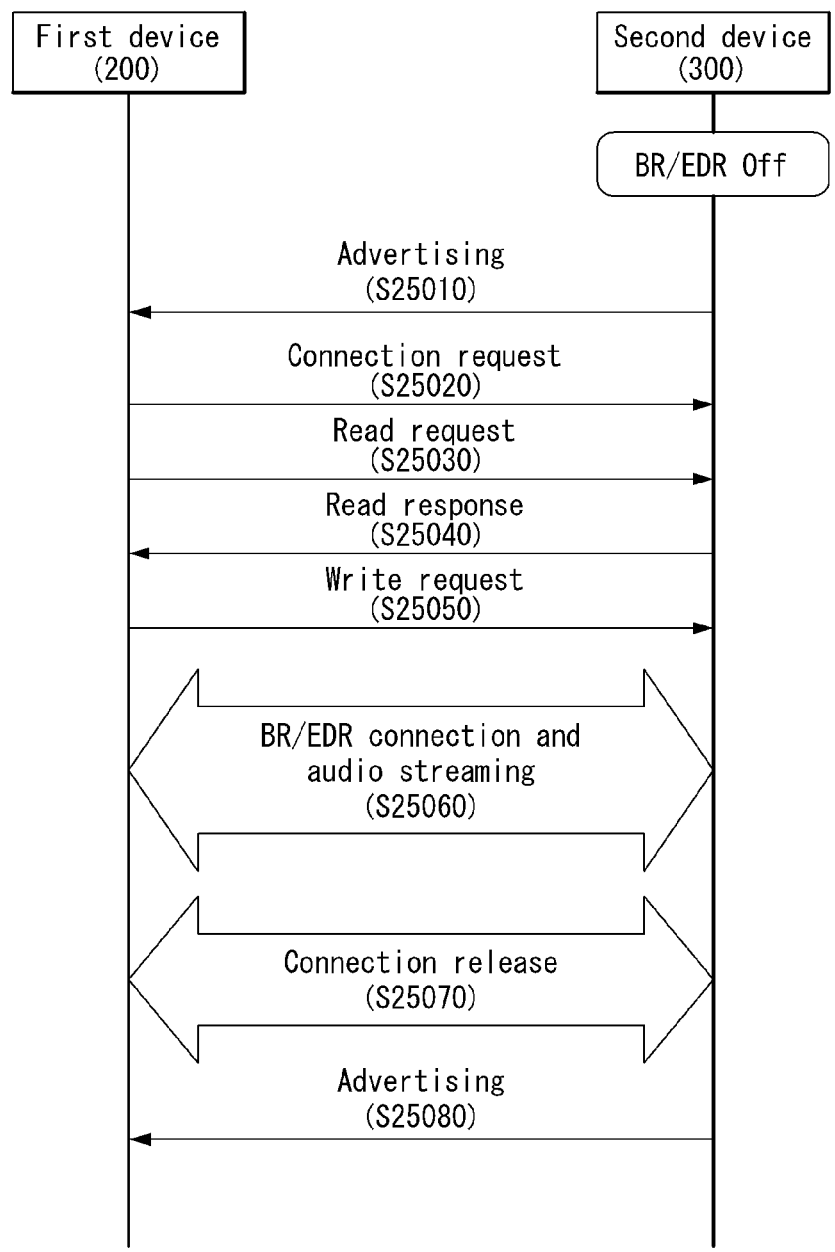

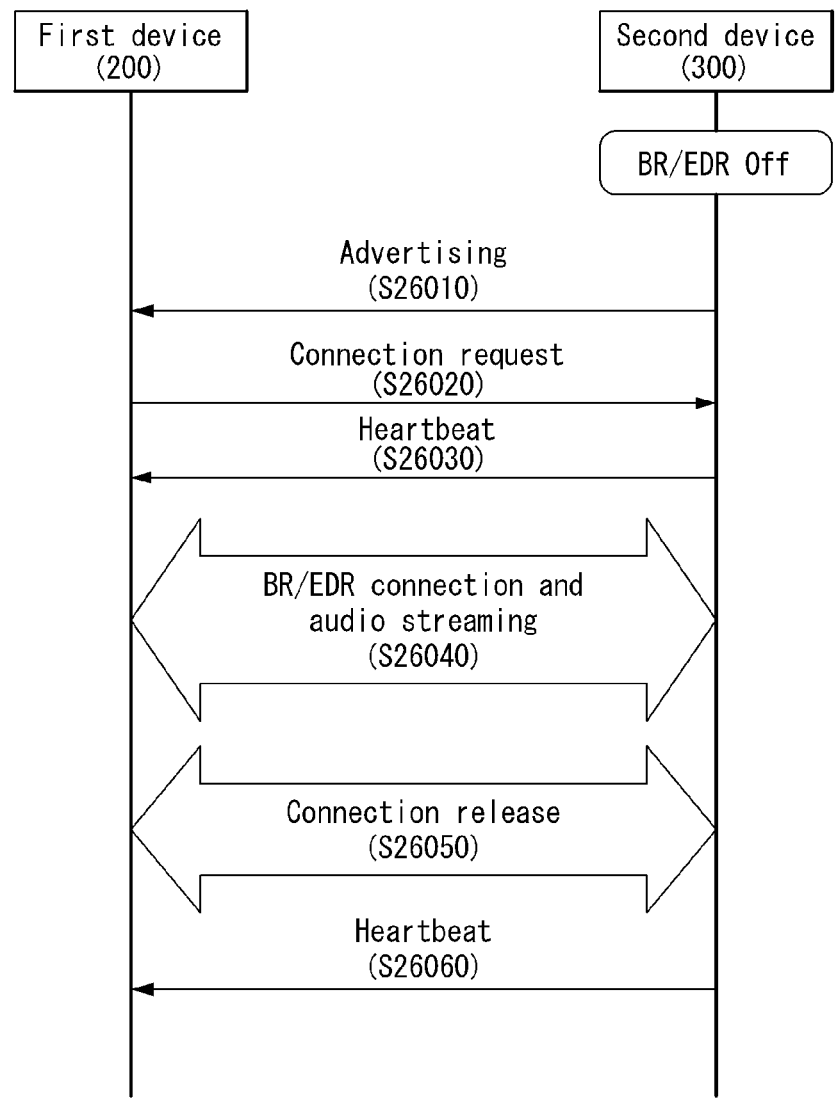

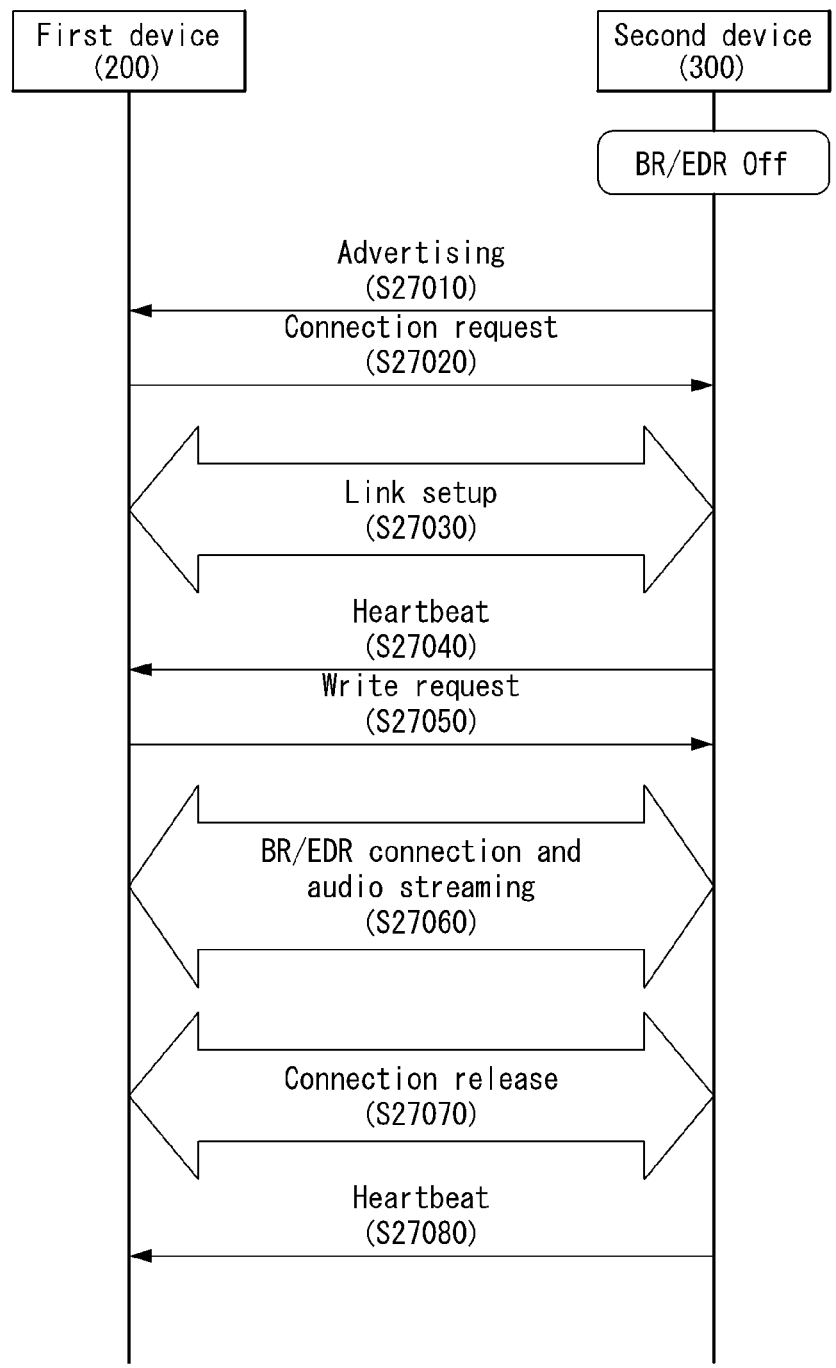

METHOD AND APPARATUS FOR CONNECTING ALTERNATIVE COMMUNICATION MEANS USING BLUETOOTH LOW ENERGY (LE)

CROSS REFERENCE TO RELATED APPLICATIONS:

This application is the National Phase of PCT International Application No. PCT/KR2016/005119, filed on May 13, 2016, which claims priority under 35 U.S.C. 119(e) to U.S. Provisional Application No. 62/161,277, filed on May 14, 2015, all of which are hereby expressly incorporated by reference into the present application.

TECHNICAL FIELD

The present invention relates to a method and apparatus for connecting an alternative communication means using the Bluetooth which is a short distance technique in wireless communication systems, and more particularly, to a method and apparatus for providing a service by connecting the Bluetooth BR/EDR using the Bluetooth Low Energy (BLE) technique.

BACKGROUND ART

Bluetooth is a short-range wireless technology standard that can wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

In a wireless communication system, in the case that a device supporting both of the Bluetooth BR/EDR scheme and the Bluetooth LE scheme attempts to perform a wireless communication through the Bluetooth, the device is needed to determine the scheme between the Bluetooth BR/EDR scheme and the Bluetooth LE scheme to perform a wireless communication in advance.

In addition, the device is needed to perform procedures including a discovery, a connection and a data exchange with a device to perform a wireless communication using the determined scheme.

However, the determination of a scheme to perform a wireless communication degrades a user convenience since it requires high level of knowledge of a wireless communication technique.

In addition, the Bluetooth BR/EDR requires higher power consumption for procedures of a discovery, a connection and a data exchange in comparison with the Bluetooth LE.

Accordingly, a method is required to detect a wireless communication scheme to connect easily and to establish a Bluetooth BR/EDR connection with low power consumption.

The technical objects to attain in the present invention are not limited to the above-described technical objects and other technical objects which are not described herein will become apparent to those skilled in the art from the following description.

Technical Solution

In order to solve the technical problem, the present invention provides a method for transmitting and receiving data performed by a first device that receives service list information through Bluetooth Low Energy (LE) including receiving an advertising message for discovering a second device from the second device, wherein the advertising message includes at least one of state information of Bluetooth BR/EDR, service list information indicating at least one service that is available to be provided through the Bluetooth BR/EDR or identification information indicating the second device; establishing a Bluetooth LE connection with the second device based on the advertising message; transmitting a first request message requesting connection information for establishing the Bluetooth BR/EDR connection with the second device through the Bluetooth LE; receiving a first response message including the connection information from the first device; and establishing a Bluetooth BR/EDR connection for providing a specific service with the second device.

In addition, in the present invention, the connection information includes at least one of frequency hopping sequence (FHS) information of the Bluetooth BR/EDR, channel map information, transport power information or connection state information.

In addition, in the present invention, the specific service is one of an audio service or a hands-free service.

In addition, in the present invention, the first request message includes first service information in relation to the specific service of the first device, and the response message further includes second service information in relation to the specific service of the second device.

In addition, in the present invention, when the specific service is the audio streaming service, each of the first service information and the second service information includes at least one of codec information, maximum bandwidth information or sampling rate information.

In addition, in the present invention, when the specific service is the hands-free service, each of the first service information and the second service information includes at least one of maximum bandwidth information and link information for a voice communication.

In addition, the present invention further includes receiving a message for maintaining the Bluetooth LE connection from the second device, when the specific service is the hands-free service.

In addition, in the present invention, establishing the Bluetooth BR/EDR connection includes: transmitting a second request message including control information indicating a connection of the Bluetooth BR/EDR to the second device; and receiving a second response message in response to the second request message.

In addition, in the present invention, the state information indicates one of turn on or off of the Bluetooth BR/EDR.

In addition, the present invention further includes disconnecting at least one connection of the Bluetooth LE connection or the Bluetooth BR/EDR connection.

In addition, the present invention further includes receiving an advertising message from the second device when both of the Bluetooth LE connection and the Bluetooth BR/EDR connection are released.

In addition, the present invention provides a device including a communication unit for communicating with a wired or wireless signal with exterior; and a processor functionally connected with the communication unit, and the processor is configured to perform: receiving an advertising message for discovering a second device from the second device, wherein the advertising message includes at least one of state information of Bluetooth BR/EDR, service list information indicating at least one service that is available to be provided through the Bluetooth BR/EDR or identification information indicating the second device; establishing a Bluetooth LE connection with the second device based on the advertising message; transmitting a first request message requesting connection information for establishing the Bluetooth BR/EDR connection with the second device through the Bluetooth LE; receiving a first response message including the connection information from the first device; and establishing a Bluetooth BR/EDR connection for providing a specific service with the second device.

Technical Effects

According to the present invention, it may be discovered a neighboring device that supports the Bluetooth BR/EDR through the Bluetooth LE and services that may be provided through the Bluetooth BR/EDR.

In addition, according to the present invention, a user convenience may be increased by providing information of the devices discovered through the Bluetooth LE.

In addition, according to the present invention, power consumption may be decreased by establishing a Bluetooth BR/EDR connection by exchanging the information for a connection of the Bluetooth BR/EDR through the Bluetooth LE with the discovered device.

In addition, according to the present invention, power consumption may be decreased by providing a service by exchanging the information for a connection of the Bluetooth BR/EDR through the Bluetooth LE with the discovered device.

The technical effects in the present invention are not limited to the above-described technical effects and other technical effects which are not described herein will become apparent to those skilled in the art from the following description.

DESCRIPTION OF DRAWINGS

FIG. 12 is a diagram illustrating an example of an operation of a device for providing a service of the Bluetooth BR/EDR.

FIGS. 15 to 18 are flowcharts illustrating an example of a method for connecting an alternative communication means through the Bluetooth LE and a data format to which the present invention is applied.

FIGS. 19 to 21 are flowcharts illustrating another example of a method for connecting an alternative communication means through the Bluetooth LE and a data format to which the present invention is applied.

FIG. 23 is a flowchart illustrating another example of a method for providing an audio streaming service of the Bluetooth BR/EDR through the Bluetooth LE to which the present invention is applied.

FIG. 24 is a flowchart illustrating an example of a method for providing a hands-free service of the Bluetooth BR/EDR through the Bluetooth LE to which the present invention is applied.

FIG. 25 is a flowchart illustrating another example of a method for providing a hands-free service of the Bluetooth BR/EDR through the Bluetooth LE to which the present invention is applied.

FIG. 26 is a flowchart illustrating still another example of a method for providing a hands-free service of the Bluetooth BR/EDR through the Bluetooth LE to which the present invention is applied.

FIG. 27 is a flowchart illustrating still another example of a method for providing a hands-free service of the Bluetooth BR/EDR through the Bluetooth LE to which the present invention is applied.

BEST MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

In addition, a message may be called as a data packet, a frame, a PDU, and so on.

Figure 1:
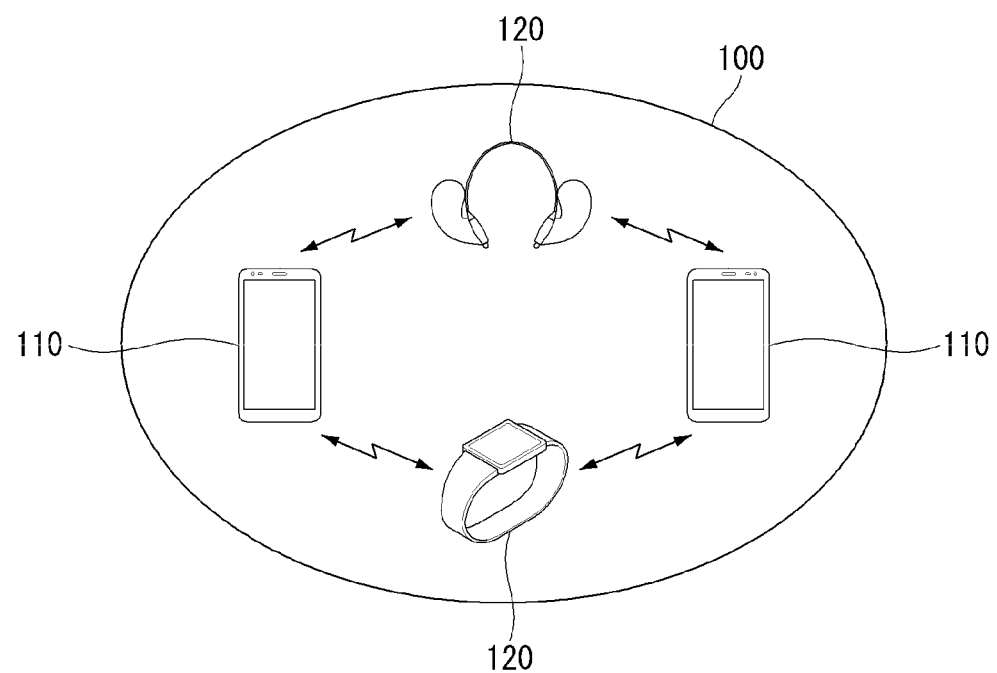
FIG. 1 is a schematic view illustrating an example of a wireless communication system using a Bluetooth low energy technology to which the present invention is applicable.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be represented as a data service device, a slave device, a slave, a server, a conductor, a host device, a gateway, a sensing device, a monitoring device, a first device, an audio gate (AG), and the like, and the client device 110 may also be represented as a master device, a master, a client, a member, a sensor device, a sink device, a collector, a second device, a hands-free device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
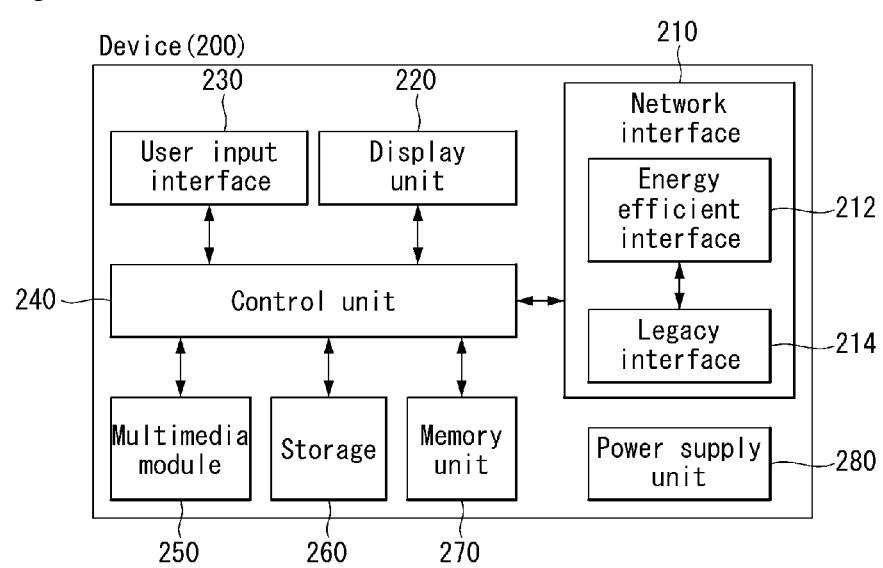
FIG. 2 shows an example of an internal block diagram of a device to which the present invention may be applied.

FIG. 2 illustrates an example of an internal block diagram of a device to which the methods proposed in the present disclosure may be implemented.

As shown in FIG. 2, a device proposed in the present invention may include a network interface 210, a display unit 220, a user input interface 230, a control unit 240, a multimedia module 250, a storage 260, a memory unit 270 and a power supply unit 280.

The network interface 210, the display unit 220, the user input interface 230, the control unit 240, the multimedia module 250, the storage 260, the memory unit 270 and the power supply unit 280 are functionally connected to perform a method proposed in this disclosure.

The network interface 210 refers to a device than enables the device to perform wired or wireless communication with other device, and may include an energy efficient interface 212 and a legacy interface 214.

The network efficient interface 212 is a device for a low power wireless communication that consumes little energy, and refers to a unit (or module) that enables the device to discover another device to establish a connection with or to transmit data.

The legacy interface 214 is a device for a wireless communication, and refers to a unit (or module) that enables the device to discover another device to establish a connection with or to transmit data.

The network interface may be called as a communication unit.

The display unit 220 refers to a unit (or module) that outputs the data received through the network interface 210 or the data stored in the storage 260 by a control of the control unit 240.

The control unit 240 refers to a module controlling an overall operation of the device. The control unit 240 may also be called a control section, a processor, a controller or the like.

The control unit 240 may include application-specific integrated circuits (ASICs), other chip sets, logic circuits and/or data processing units.

The control unit 240 controls the network interface 210 so as to receive an advertising message from other device, controls the communication unit so as to transmit a scan request message to the other device and to receive a scan response message from the other device in response to the scan request, and controls the network interface so as to transmit a connection request message to the server device in order to establish a Bluetooth connection with the other device.

Furthermore, after a Bluetooth LE connection is established through a connection procedure, the control unit 240 controls the communication unit so as to read or write data using an attribute protocol from the other device.

The multimedia module 250 is a unit (or module) for playback various types of multimedia and the multimedia module 250 may be implemented in the control unit 240 or separately implemented.

The storage 260 is a unit implemented in various types of devices, and refers to a unit of nonvolatile property that is available to store various types of data.

The memory unit 270 is a unit implemented in various types of devices, and refers to a unit of volatile property in which various types of data are temporarily stored.

The memory unit 270 may include read-only memory (ROM), random access memory (RAM), flash memory, a memory card, a storage medium and/or other storage devices.

The wireless communication unit 210 may include a baseband circuit for processing a wireless signal. When an embodiment is implemented in software, the aforementioned technique may be implemented as a module (process, function, etc.) performing the aforementioned function. The module may be stored in the memory unit 270 or the storage 260, and executed by the processor.

The memory unit 270 may be present inside or outside the control unit 240 and may be connected to the control unit 240 through various well-known means.

The power supply unit 280 refers to a module receiving external power or internal power and supplying the power required for the operation of each of the components under the control of the control unit 240.

As discussed above, the BLE technology has a relatively small duty cycle and power consumption may be significantly reduced through a low data rate, and accordingly, the power supply unit may supply the power required for the operation of each of the components using even small output power (10 mW (10 dBm) or smaller).

The user input interface 230 refers to a module providing user input, such as a screen button, to the control unit 240 to enable a user to control the operation of the device.

Figure 3:
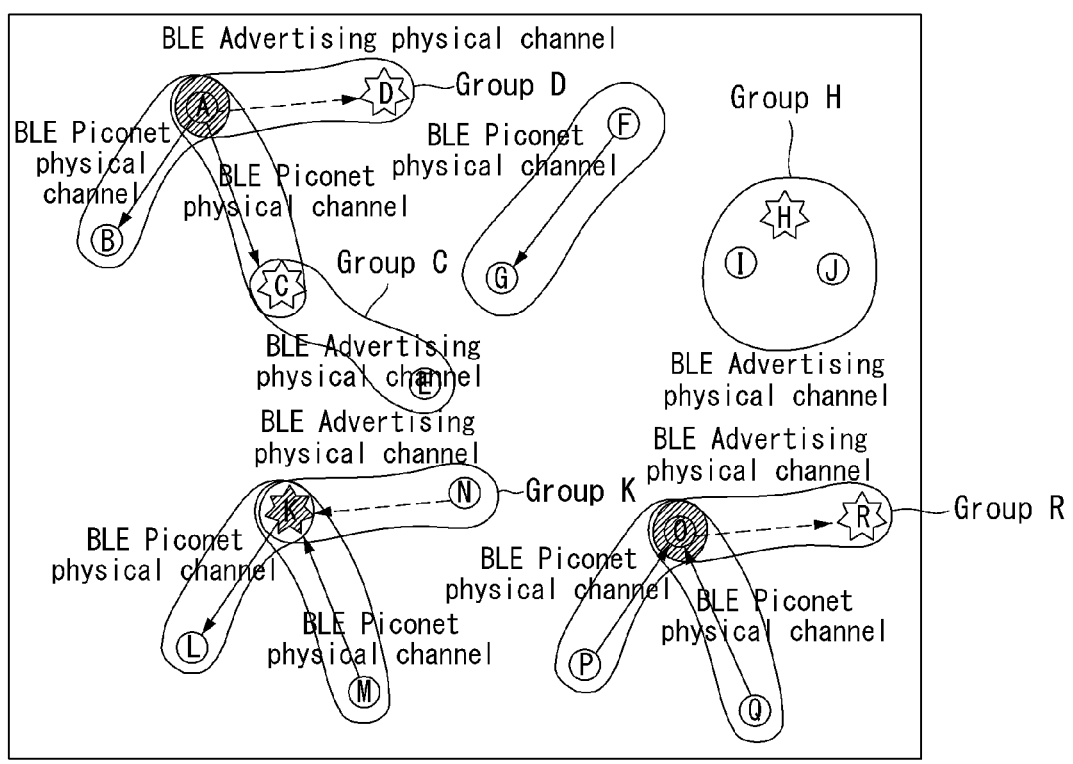
FIG. 3 is a view illustrating an example of a Bluetooth low energy topology.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 3, five different device groups are present.

Device D is an advertiser and device A is an initiator (group D).

Device E is a scanner and Device C is an advertiser (group C).

Device H is an advertiser, and devices I and J are scanners (group H).

Device K is also an advertiser, and device N is an initiator (group K).

Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

Figure 4:
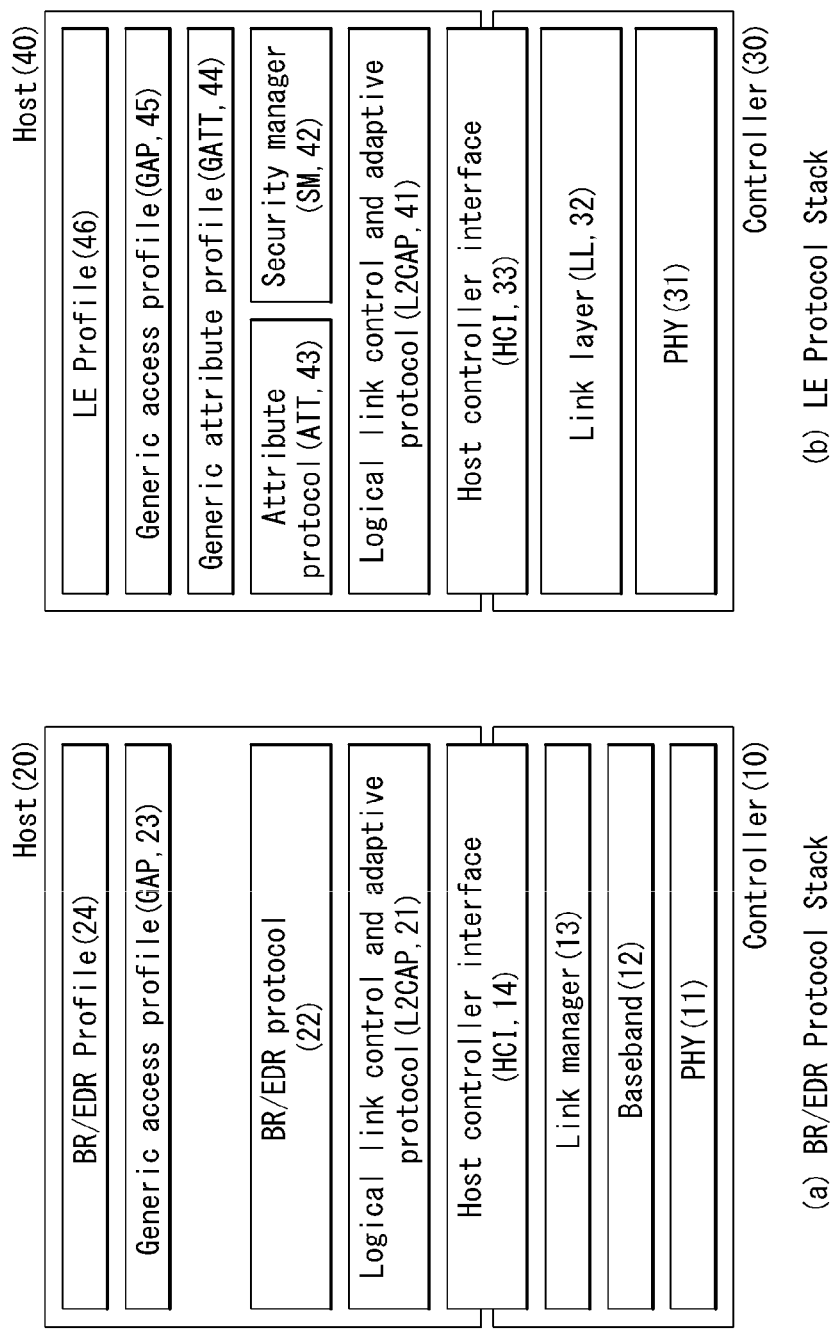
FIG. 4 and FIG. 5 are diagrams illustrating an example of the Bluetooth communication architecture to which the present invention may be applied.
Figure 5:
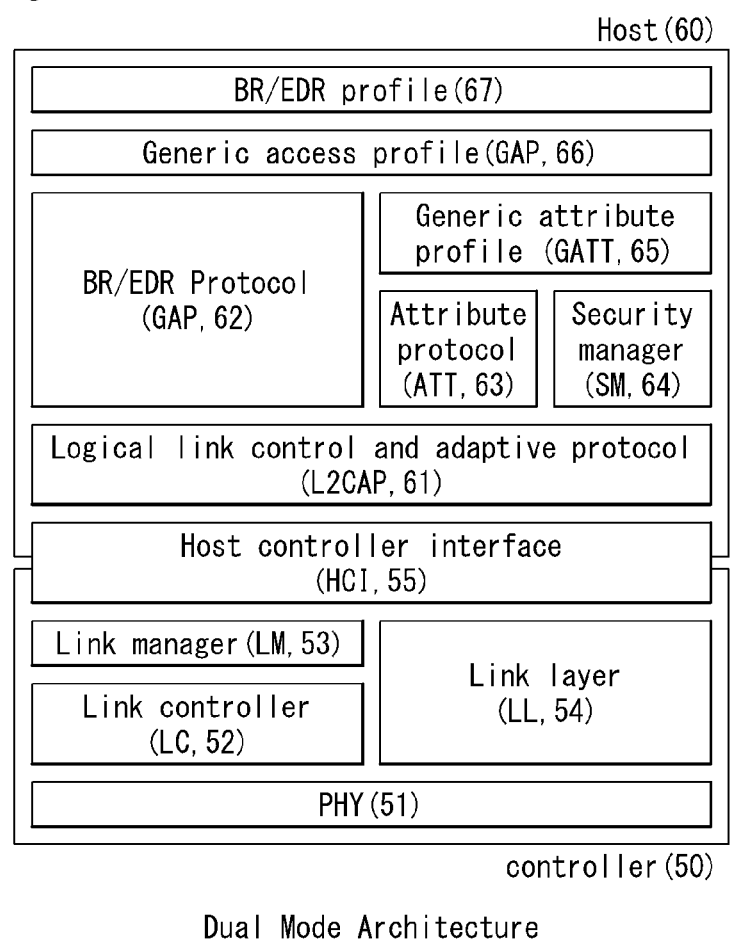

FIG. 4 and FIG. 5 are diagrams illustrating an example of the Bluetooth communication architecture to which the present invention may be applied.

Referring to FIG. 4 and FIG. 5, (a) of FIG. 4 illustrates an example of a protocol stack of the Bluetooth basic rate (BR)/enhanced data rate (EDR), and (b) of FIG. 4 illustrates an example of a protocol stack of the Bluetooth Low Energy (LE).

In addition, (c) of FIG. 5 illustrates an example of Dual Mode Architecture for supporting both of the Bluetooth BR/EDR and the Bluetooth LE.

In detail, as illustrated in (a) of FIG. 4, the Bluetooth BR/EDR protocol stack may include an upper controller stack 20 and a lower host stack 10 with respect to a host controller interface (HCI) 18.

The controller stack 10 refers to hardware for transmitting or receiving a Bluetooth packet to and from a wireless transceiver module receiving a Bluetooth signal of 2.4 GHz, and is connected to a Bluetooth module, the Host stack 20, to control the Bluetooth module and performs an operation.

The controller stack 10 may include a BR/EDR PHY layer 11, a BR/EDR baseband layer 12, and a link manager layer 13.

The BR/EDR PHY layer 11 is a layer transmitting and receiving a 2.4 GHz wireless signal. In the case that Gaussian frequency shift keying (GFSK) modulation is used, the BR/EDR PHY layer 11 may transmit data by hopping 79 RF channels.

The BR/EDR baseband layer 12 functions to transmit a digital signal, selects a channel sequence hopping 1400 times per second, and transmits a time slot having a length of 625 us for each channel.

The link manager layer 13 controls an overall operation (link setup, control and security) of a Bluetooth connection using a link manager protocol (LMP).

The link manager layer 13 may perform the following functions.

The link manager layer 13 may perform ACL/SCO logical transport, logical link setup, and control.

Detach: The link manager layer 13 stops s connection and informs a counterpart device about the reason for stopping the connection.

The link manager layer 13 performs a power control and a role switch.

The link manager layer 13 performs a security (authentication, pairing and encryption) function.

The host controller interface layer 14 provides an interface between the host stack and the controller stack to allow the host to provide a command and data to the controller and allow the controller to provide an event and data to the host.

The host stack (or host module 20) includes a logical link control and adaptation protocol (L2CAP) 21, BR/EDR protocol 22, a generic access profile (GAP) 23, and a BR/EDR profile 24.

The logical link control and adaptive protocol (L2CAP) 21 may provide a two-way channel for transmitting data to a specific protocol or a profile.

The L2CAP 21 may multiplex various protocols and profiles provided by a Bluetooth higher layer.

The L2CAP of the Bluetooth BR/EDR uses a dynamic channel, supports a protocol service multiplexer, retransmission, and a streaming mode, and provides segmentation and reassembly, per-channel flow control, and error control.

The BR/EDR protocol 22 and the BR/EDR profile 24 define a service (profile) using the Bluetooth BR/EDR and an application profile for exchanging the data, and the Generic Access Profile (GAP) 23 defines a device discovery, a connection and a level of security.

As illustrated in (b) of FIG. 4, the Bluetooth LE protocol stack includes a controller stack 30 operable to process a wireless device interface of which timing is important and a host stack 40 operable to process high level data.

First, the controller stack 30 may be implemented using a communication module that may include a Bluetooth wireless device, for example, a processor module that may include a processing device such as a microprocessor.

The host stack 40 may be implemented as a part of an OS that operates on a processor module or may be implemented as an instantiation of a package on the OS.

In some examples, the controller stack and the host stack may operate or may be executed on the same processing device within a processor module.

The controller stack 30 includes a physical layer (PHY) 31, a link layer 32 and a host controller interface 33.

The physical layer (PHY) (wireless transceiver module) 31 is a layer for transmitting and receiving a 2.4 GHz wireless signal, and uses Gaussian frequency shift keying (GFSK) modulation and a frequency hopping technique including 40 RF channels.

The link layer 32 serving to transmit or receive a Bluetooth packet provides a function of generating a connection between devices after performing the advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43, a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher layer using the L2CAP.

First, the Logical Link Control and Adaptation Protocol (L2CAP) 41 may provide a single two-way channel for transmitting data to a specific protocol or profile.

The L2CAP 41 may operate to multiplex data between higher layer protocols, segment and reassemble packages, and to manage the transmission of multicast data.

Three fixed channels (one for a signaling channel (CH), one for a security manager, and one for an attribute protocol) are used in the Bluetooth LE.

Meanwhile, the basic rate/enhanced data rate (BR/EDR) uses a dynamic channel and supports a protocol service multiplexer, retransmission, streaming mode, and the like.

The security manager 42 is a protocol for authenticating a device and providing a key distribution.

The attribute protocol 43 defines a rule for accessing data of a counterpart device by a server-client structure. The ATT 43 includes six types of messages (request, response, command, notification, indication, and confirmation) as follows.

① Request and Response message: a request message is a message to request or forward specific information from a client device to a server device, and a response message, as a response message with respect to the request message, refers to a message transmitted from the server device to the client device.

② Command message: a message transmitted from the client device to the server device in order to indicate a command of a specific operation. The server device does not transmit a response with respect to the command message to the client device.

③ Notification message: a message transmitted from the server device to the client device in order to provide notification of an event or the like. The client device does not transmit a confirmation message with respect to the notification message to the server device.

④ Indication and confirmation message: a message transmitted from the server device to the client device in order to provide notification of an event or the like. Unlike the notification message, the client device transmits a confirmation message regarding the indication message to the server device.

The generic access profile (GAP) 45, a layer newly implemented for the Bluetooth LE technique, is used to select a role for communication between Bluetooth LE devices and to control how a multi-profile operation takes place.

Furthermore, the generic access profile 45 is mainly used for device discovery, connection generation, and security procedure part, defines a scheme for providing information to a user, and defines types of attributes as follows.

① Service: It defines a basic operation of a device by a combination of behaviors related to data.

② Include: It defines a relationship between services.

③ Characteristics: It is a data value used in a server.

④ Behavior: It is a format that may be read by a computer defined by a Universal Unique Identifier, value type (UUID value type).

The LE profile 46, profiles dependent upon GATT, is mainly applied to a BLE device. The LE profile 46 may include, for example, Battery, Time, FindMe, Proximity, Time, and the like, and details of GATT-based Profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol 43 is used when services are configured. For example, the GATT 44 may operate to define how attributes of the attribute protocol are grouped together with services and operate to describe features associated with services.

Thus, the GATT 44 and the ATT 43 may use features in order to describe status and services of a device and describe how the features are related and used.

FIG. 5 (c) shows a dual mode structure that supports both of the Bluetooth BR/EDR and the Bluetooth LE.

The present invention provides a method for establishing a Bluetooth BR/EDR connection by discovering a device that supports the Bluetooth BR/EDR through the Bluetooth LE of which power consumption is low, and by exchanging information for a connection of the Bluetooth BR/EDR, in order to decrease the power consumption when establishing a Bluetooth BR/EDR connection in a device that supports both of the Bluetooth BR/EDR and the Bluetooth LE.

Hereinafter, procedures of the Bluetooth low energy (BLE) technique will be briefly described.

The BLE procedure may be classified as a device filtering procedure, an advertising procedure, a scanning procedure, a discovering procedure, a connecting procedure, and so on.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events includes at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index is not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in a Bluetooth interface will be briefly described. BLE devices use packets defined as follows Packet Format The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 6:
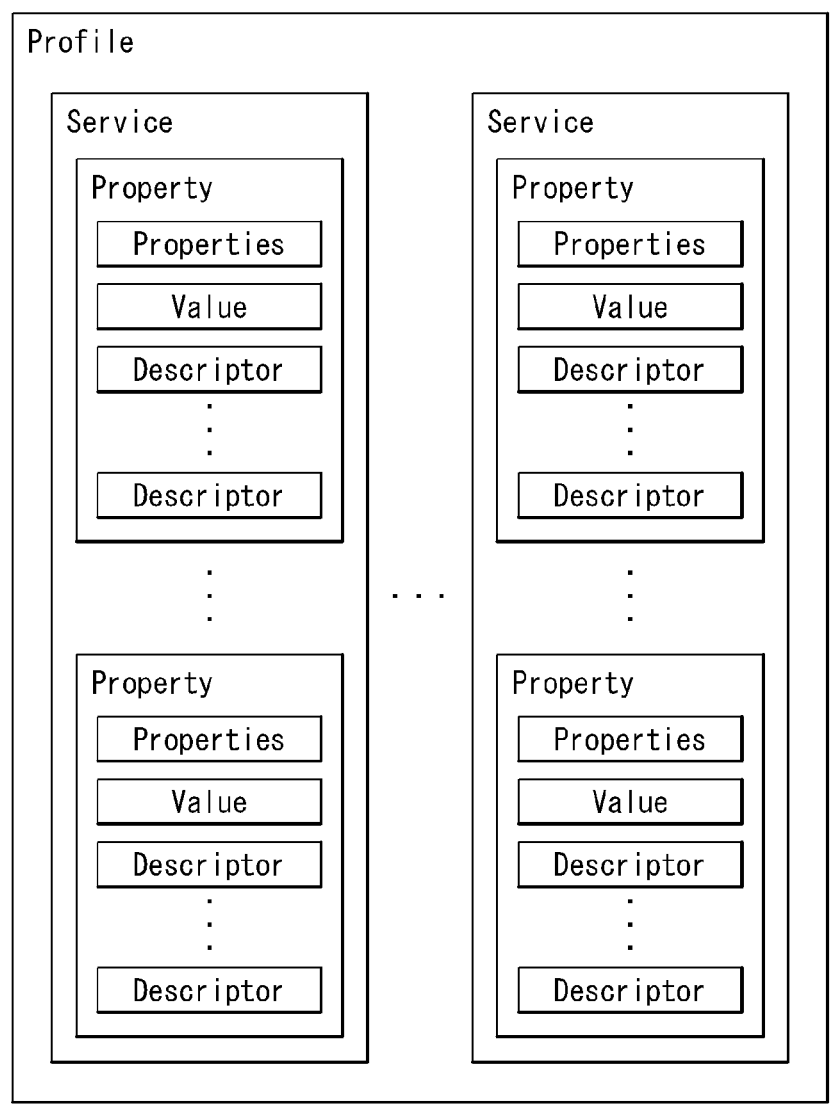
FIG. 6 is a view illustrating an example of a structure of a generic attribute profile (GATT) of Bluetooth low energy.

FIG. 6 is a diagram illustrating an example of a Generic Attribute Profile (GATT) of Bluetooth Low Energy.

Referring to FIG. 6, it may be shown a structure for a Profile Data exchange of Bluetooth Low Energy.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute

Type: Type of attribute

Value: Value of attribute

Permission: Right to access attribute

Figure 7:
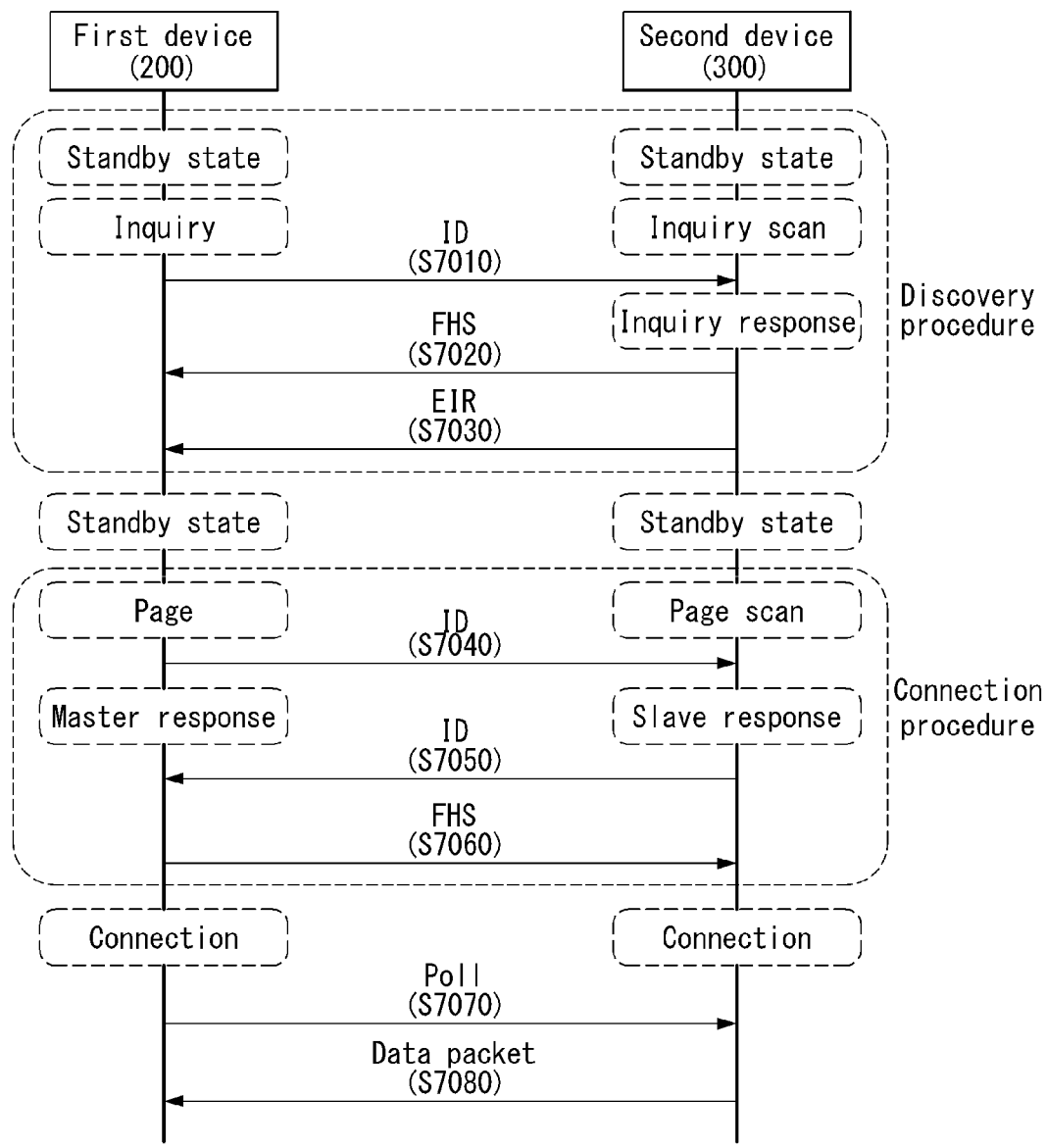
FIG. 7 is a diagram illustrating discovery and connection procedures of the Bluetooth BR/EDR.

FIG. 7 is a diagram illustrating discovery and connection procedures of the Bluetooth BR/EDR.

Discovery Procedure

The first device 200 and the second device 300 in the Bluetooth BR/EDR disconnection state exist in a standby state, and then for searching the Bluetooth BR/EDR, the first device 200 exists in an inquiry state and the second device 300 becomes an inquiry scan state.

In the inquiry state, the first device 200 transmits an ID packet to perform a Bluetooth BR/EDR discovery procedure (step, S7010), and in response to the inquiry, the first device 200 receives a frequency hop synchronization (FHS) packet from the second device 300 (step, S7020).

When the second device 300 intends to transmit additional information to the second device 300, the second device 300 may transmit the additional information to the first device 200 using an enhanced inquiry (EIR) packet (step, S7030).

When the first device 200 that verifies existence and information of other devices through such a search intends to be connected with the second device 300, the first device 200 performs a paging procedure.

Paging Procedure

In the paging procedure, the first device 200 enters a BR/EDR paging state and the second device 300 enters a paging scan state.

The first device 200 transmits an ID packet to the second device 300 in the paging state (step, S7040).

When the second device 300 receives the ID packet transmitted by the first device, the first device 200 enters a BR/EDR master response state in the BR/EDR paging state and the second device 300 enters a BR/EDR slave state in the BR/EDR paging state.

Thereafter, the first device 200 transmits a second ID packet in a channel transmitting the ID packet (step, S7050).

The second device 300 receiving the second ID packet transmits a frequency hopping synchronization (FHS) packet to the first device 200 for frequency synchronization (step, S7060).

When the paging procedure is completed, the first device 200 and the second device 300 are switched to the BR/EDR connection state.

Thereafter, the second device 300 is switched to a hopping pattern of the first device 200, and in order to verify this, the first device 200 transmits a Poll packet to the second device 300 (step, S7070). The second device receiving the Poll packet transmits a data packet to the first device 200 in response to the Poll packet (step, S7080) and terminates the Bluetooth BR/EDR connection procedure.

Such a procedure is a procedure performed in the case that devices are intended to perform a wireless communication through the Bluetooth BR/EDR. In the procedure, there is a problem that it is needed to be identified whether the first device and the second device are devices that support the Bluetooth BR/EDR, and a desired service can be used only when the Bluetooth BR/EDR is connected and a communication is performed using the Bluetooth BR/EDR.

Accordingly, in order to solve the problem, the present invention provides a method for connection the Bluetooth BR/EDR by identifying whether each device supports the Bluetooth BR/EDR through the Bluetooth LE and which service is provided.

Figure 8:
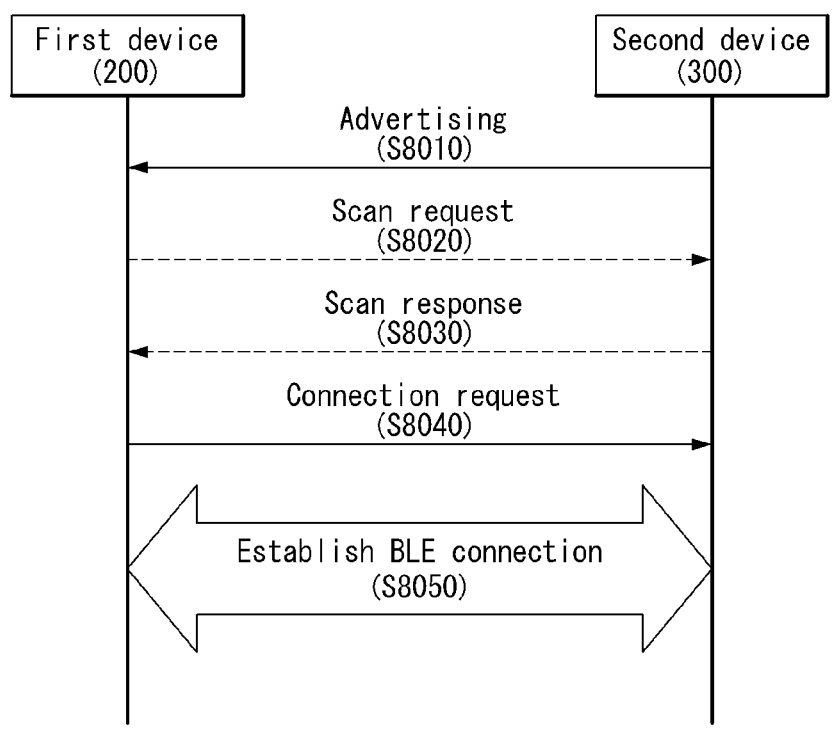
FIG. 8 is a diagram illustrating discovery and connection procedure of the Bluetooth LE.

FIG. 8 is a diagram illustrating discovery and connection procedure of the Bluetooth LE.

Referring to FIG. 8, the second device 300 may inform itself by transmitting an advertising message to neighboring devices by using three advertising channels described above (step, S8010).

In this case, the second device 300 transmits the advertising message while hopping the three advertising channels in its own time interval.

The first device 200 that receives the advertising message transmitted from the second device may discover the second device 300, and in the case of requesting additional information, the first device 200 transmits a scan request message to the second device 300 (step, S8020).

The second device 300 transmits a scan response message including the additional information to the first device 200 in response to the scan request message (step, S8030).

In the case that the first device 200 is intended to establish a Bluetooth LE connection with the second device 300, the first device 200 transmits a connection request message to the second device 300 (step, S8040), and establishes a Bluetooth LE connection by synchronizing timing information and the like with the second device (step, S8050).

The present invention proposes a method able to decrease power consumption by establishing a connection of the Bluetooth BR/EDR through the Bluetooth LE connection establishing procedure and the Bluetooth LE connection.

Figure 9:
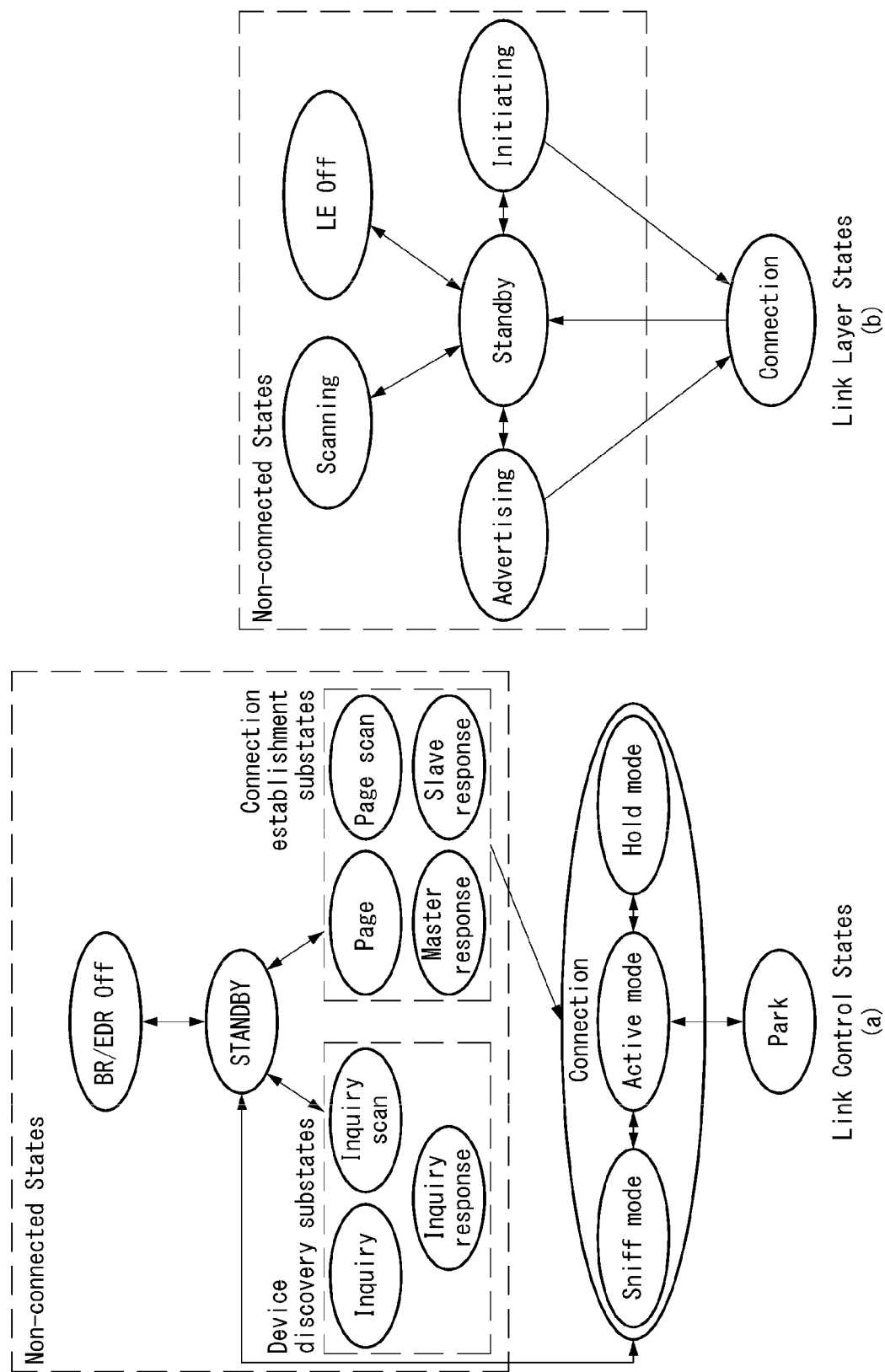
FIG. 9 is a diagram illustrating a state of a link controller and a link layer according to a Bluetooth compatible communication method.

FIG. 9 is a diagram illustrating a state of a link controller and a link layer according to a Bluetooth compatible communication method.

In the present invention, the link controller state means a state of a Bluetooth BR/EDR module, and the link layer state means a state of a Bluetooth LE module.

FIG. 9(*a*) is a state diagram illustrating an operation of a baseband or a link controller of the BR/EDR protocol stack described above, and FIG. 9(*b*) is a state diagram illustrating an operation of a link layer of the LE protocol stack described above.

As shown in the drawing, the link controller and the link layer are the same on the point that they are in a standby state depending on BR/EDR on/off state or on/off state of LE or perform a basic operation of connecting a corresponding Bluetooth device, but have a difference in detailed operations.

As shown in FIG. 9(*a*), the link controller state is divided into three major states and seven sub states. The three major states are a standby, a connection and a park, and seven sub states are a page, a page scan, an inquiry, an inquiry scan, an inquiry response, a master response and a slave response.

In the connection state, a sniff mode, an active mode and a hold mode are included.

A substrate is an intermediate state used to establish a connection and to perform a discovery of a device.

As shown in FIG. 9(*b*), the link layer state is divided into a standby, an advertising, a scanning, an initiating and a connection.

The terms describing the state shown in FIG. 9 may be interpreted as the terms commonly used in the general Bluetooth technique.

Figure 10:
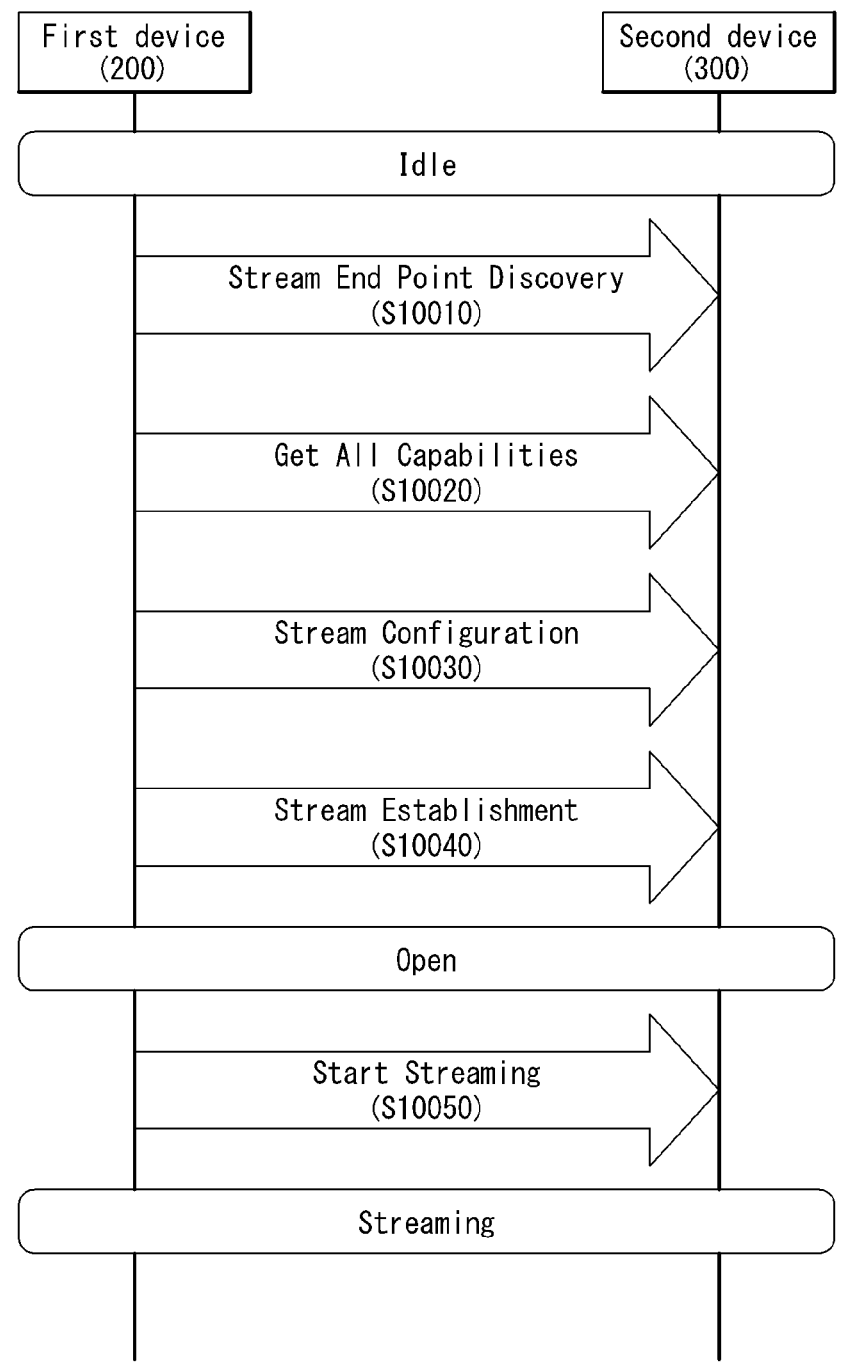
FIG. 10 is a flowchart illustrating a procedure for providing an audio streaming service of the Bluetooth BR/EDR.

FIG. 10 is a flowchart illustrating a procedure for providing an audio streaming service of the Bluetooth BR/EDR.

An initial state of the first device 200 which is a source device and the second device 300 which is a sink device is an idle state.

In the case that a request is input from a user or an internal event occurs, the first device 200 performs a Stream End Point (SEP) Discovery procedure (step, S10010).

Through the SEP Discovery procedure, the first device 200 may obtain an media type and a Stream End Point Identifier (SEID) which is an identifier of each stream end point.

Later, in order to obtain service capabilities of the sink device, the first device 200 and the second device 300 performs a Get All Capabilities Procedure (step, S10020).

Through this procedure, the first device 200 may obtain two types of service capabilities from the second device 300. One is an application service capability and the other is a transport service capability.

The application service capability for A2DP may include an audio codec capability, a contents protection capability, and so on.

In this case, the Advanced Audio Distribution Profile (A2DP) means a Bluetooth profile that supports a stereo audio.

The transport service capability may include a framing, a segmentation, an encapsulation, a reporting of delivery performance, a packet loss detection, a packet recovery, a robust header compression among header compression schemes and a multiplexing transport session for a transport channel, and the like.

Based on the obtained SEP information and the service capability information, the first device 200 determines the best audio streaming parameters (e.g., a codec, a contents protection and a transport service, etc.) for the first device 200 and the second device 300.

Later, the first device 200 performs a Stream Configuration Procedure with the second device 300 (step, S10030).

Through these procedures, the first device 200 constructs its own audio parameters, and requests to construct audio parameters to the second device 300.

Later, the first device 200 and the second device 300 forms L2CAP channels through a Stream Establishment Procedure (step, S10040), and enters an open state.

When an input from a user or an internal event occurs in the open state, the first device 200 performs a Start Streaming Procedure for providing an audio streaming service (step, S10050).

Through this, states of the first device 200 and the second device 300 are switched from the open state to a streaming state, and after the Start Streaming Procedure is completed, an audio streaming is started.

Through such a procedure, a device may provide an audio streaming service through the Bluetooth BR/EDR. However, there exists a problem that the procedure from a BR/EDR connection to a provision of the audio streaming service causes great power consumption.

Accordingly, the present invention provides a method for providing a Bluetooth BR/EDR connection and an audio streaming service through the Bluetooth LE.

Figure 11:
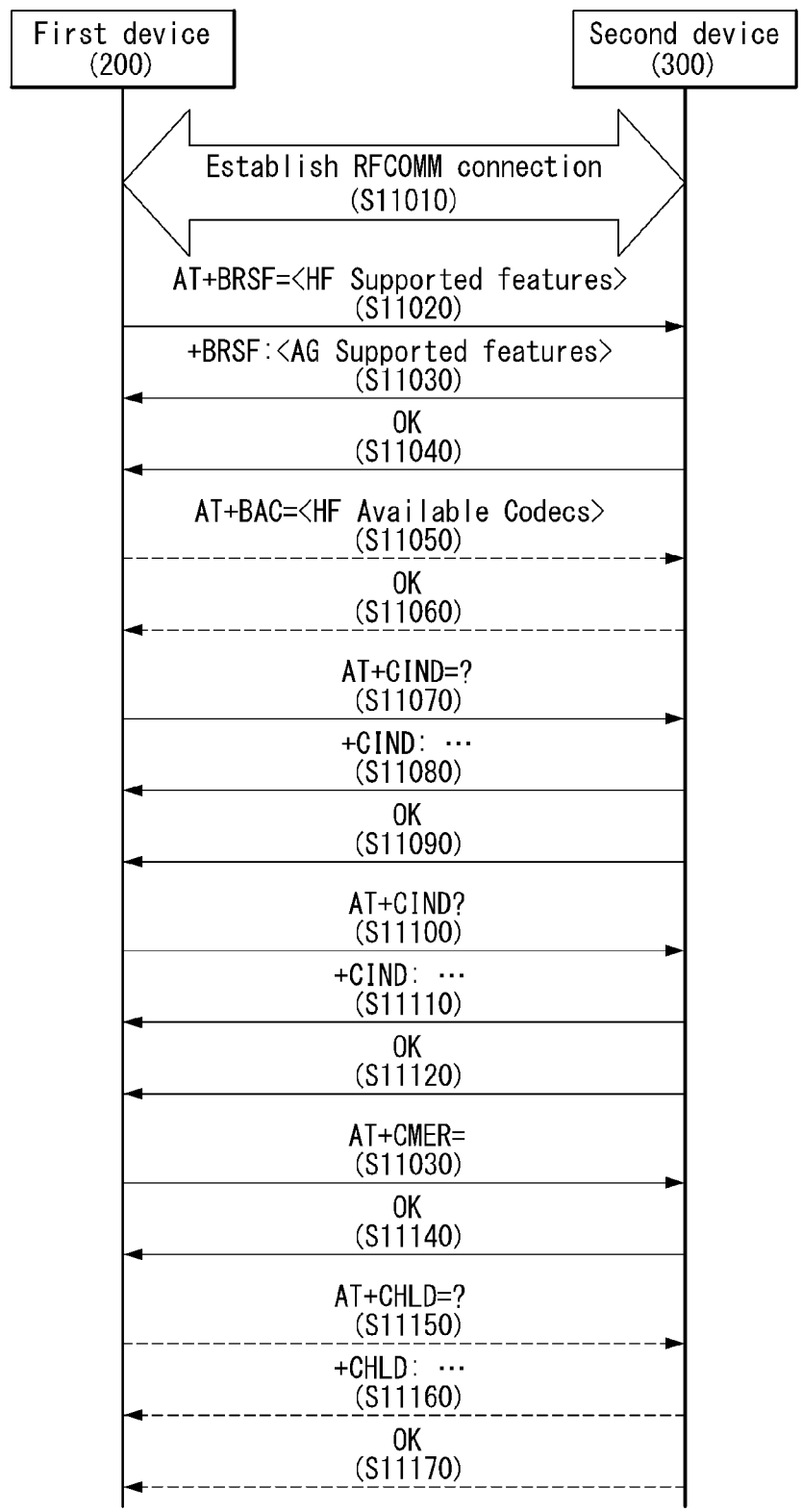
FIG. 11 is a flowchart illustrating a procedure for providing a hands-free service of the Bluetooth BR/EDR.

FIG. 11 is a flowchart illustrating a procedure for providing a hands-free service of the Bluetooth BR/EDR.

Referring to FIG. 11, a hand-free service may be provided through the Bluetooth BR/EDR.

Particularly, the first device 200 which is a hands-free device or the second device 300 which is an audio gate (AG) starts a Service Level Connection establishment procedure when an input from a user or an internal event occurs.

Since the Service Level Connection establishment procedure requires an RFCOMM connection, an RFCOMM data link channel is needed to be established between the first device 200 and the second device 300.

In the case that the RFCOMM data link channel is not established, the first device 200 and the second device 300 perform an RFCOMM Connection Establishment Procedure (step, S11010).

An RFCOMM connection is established between the first device 200 and the second device 300, a Service Level Connection Initialization Procedure is performed.

The first device 200 informs hands-free feature to the second device 300, and transmits "AT+BRSF=<HF supported features>" Command to the second device 300 in order to obtain the feature supported by the second device 300 by using "+BRSF result code" (step, S11020).

In the case that the first device 200 supports a Codec Negotiation feature, through the "AT+BRSF" command transmitted from the second device 300, it may be identified whether the second device 300 supports the Codec Negotiation feature (steps, S11030 and S11040).

In the case that both of the first device 200 and the second device 300 support the Codec Negotiation feature, the first device 200 transmits "AT+BAC=<HF available codecs>" command in order to inform the codecs supported by the first device 200 (step, S11050), and receive a response to it (step, S11060).

The first device 200 may obtain supportable indicators and the ordering from the second device 300 by using "the AT+CIND=?" Test command (steps, S11070, S11080 and S11090).

In the case that the first device 200 has a necessary supported indicator and ordering information, the first device may obtain a current state of the indicators of the second device 300 by using "AT+CIND?" Read command (steps, S11100, S11110 and S11120).

After the second device 300 obtains states of the indicators, the first device 200 may enable Indicator Status update function of the second device 300 by transmitting "AT+CMER" command to the second device (step, S11130), and may receive a response to it (step, S11140).

The second device 200 maintains the function until AT+CMER command for disabling the function or a service level connection between the first device 200 and the second device 300 is terminated.

Later, when "Call waiting and 3-way calling" of a features bitmap supported by the first device 200 and the second device 300 is setup, the first device 200 transmits AT+CHLD=? test command to the second device 300 in order to obtain information in relation to maintaining of a call and information in relation to whether a multiparty service of the second device 300 is supported in the second device 300 (step, S11150).

When the first device 200 successfully obtains the information in relation to maintaining of a call and the information in relation to whether a multiparty service of the second device 300 is supported in the second device 300, the first device determines that overall initial configuration of a service level connection is complete and a connection is established (steps, S11160 and S11170).

Through such a procedure, a device may provide a hands-free service through the Bluetooth BR/EDR. However, there exists a problem that the procedure from a BR/EDR connection to a provision of the hands-free service causes great power consumption.

Accordingly, the present invention provides a method for providing a Bluetooth BR/EDR connection and a hands-free service through the Bluetooth LE.

FIG. 12 is a diagram illustrating an example of an operation of a device for providing a service of the Bluetooth BR/EDR.

Referring to FIG. 12, an operation of the Bluetooth BR/EDR is shown for providing an audio streaming service and a hands-free service of the Bluetooth BR/EDR.

Particularly, FIG. 12(a) shows an operation of the case of providing an audio streaming service through Bluetooth BR/EDR A2DP.

In the case that an audio streaming service is provided through Bluetooth BR/EDR A2DP, a link is established temporally between two devices only when an audio steaming is actually provided, and a service can be provided.

However, since a link is established when an audio streaming is generated in such a method, there exists a problem that delay may occur in providing a service. In addition, there is a problem that power consumption is great in the case that a Bluetooth BR/EDR connection is maintained consecutively in order to avoid such delay.

Accordingly, in order to decrease such connection delay and power consumption, the present invention proposes a method for providing an audio streaming service by maintaining a connection of the Bluetooth LE of which power consumption is small and establishing Bluetooth BR/EDR A2DP link quickly through the Bluetooth LE when an audio streaming occurs.

FIG. 12(b) above shows an operation of the case that a hands-free service is provided through Bluetooth BR/EDR Hands-Free Profile (HFP).

In the case that a hands-free service is provided through the Bluetooth BR/EDR HFP, a link is required for a connection in a service level, and when a call is incoming, two devices are needed to be synchronized for fast response.

Accordingly, in order to provide a hands-free service, a connection of the Bluetooth BR/EDR is needed to be persistently maintained, and when a call is incoming, a SCO channel is needed to be established through a Bluetooth BR/EDR connection.

In order to persistently maintain the Bluetooth BR/EDR connection, devices persistently transmit and receive a null packet having no data and an Ack in response to it.

However, there exists a disadvantage of great power consumption in maintaining persistently a Bluetooth BR/EDR connection.

Accordingly, in order to decrease such a power consumption, the present invention proposes a method for providing a hands-free service by persistently maintaining a Bluetooth LE connection having small power consumption instead of the Bluetooth BR/EDR, and connecting a Bluetooth BR/EDR connection when a call is incoming.

Hereinafter, a method for connecting an alternative communication means through the Bluetooth LE will be described.

Figure 13:
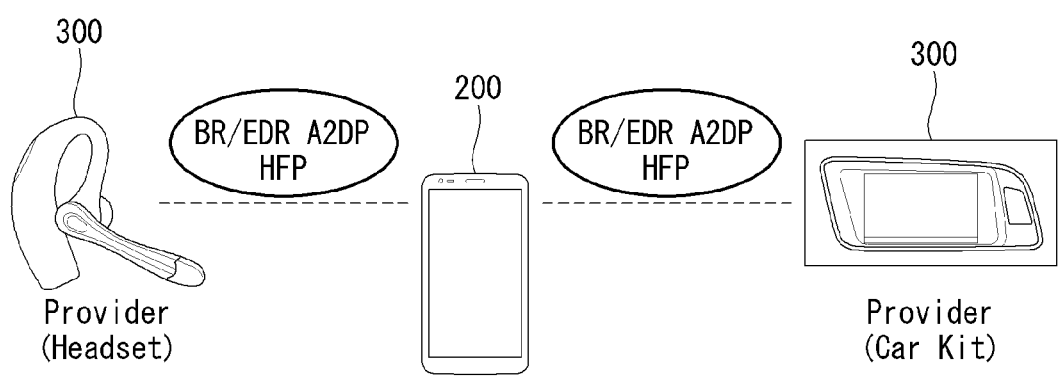
FIG. 13 is a diagram briefly illustrating an example of a method for connecting an alternative communication means through the Bluetooth Low Energy (LE) to which the present invention is applied.

FIG. 13 is a diagram briefly illustrating an example of a method for connecting an alternative communication means through the Bluetooth Low Energy (LE) to which the present invention is applied.

Referring to FIG. 13 above, the first device 200 may obtain information of an alternative communication means (e.g., Bluetooth BR/EDR, Wi-Fi, Wi-Fi Direct, etc.) supported by the second device 300 through the Bluetooth LE and information of a service (e.g., Bluetooth BR/EDR A2DP HFP, Wi-Fi Direct Miracast, Wi-Fi Direct File Transfer, etc.) that may be provided through the alternative communication means.

Based on the information obtained as such, the first device 200 may be connected through the alternative communication means with the second device 300, and may provide various services through the connected alternative communication means.

Figure 14:
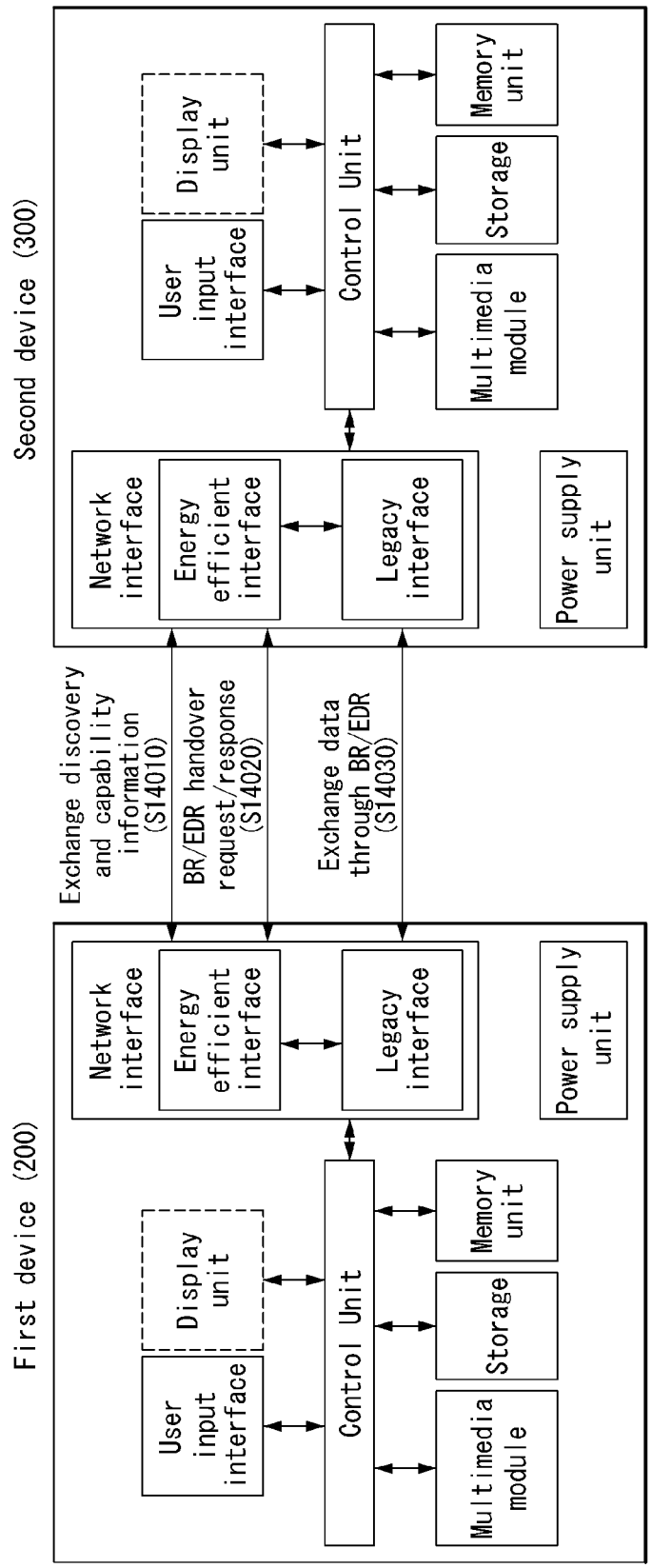
FIG. 14 is a diagram illustrating an example of a message transmission and reception between network interfaces for connecting an alternative communication means through the Bluetooth Low Energy (LE) to which the present invention is applied.

FIG. 14 is a diagram illustrating an example of a message transmission and reception between network interfaces for connecting an alternative communication means through the Bluetooth Low Energy (LE) to which the present invention is applied.

Referring to FIG. 14, the first device 200 and the second device 300 may exchange capability information by discovering a counterpart device through an energy efficient interface for a low power wireless communication, and may perform a data exchange by connecting a legacy interface through the exchanged capability information.

Hereinafter, it will be described for exemplifying the energy efficient interface as the Bluetooth LE and exemplifying the legacy interface as the Bluetooth BR/EDR.

Particularly, the first device 300 may discover the second device 300 through the Bluetooth LE, and may exchange capability information with the second device (step, S14010).

The capability information may include alternative communication technique information (e.g., Bluetooth BR/EDR, Wi-Fi, Wi-Fi Direct, NFC, etc.) supported by each device and service list information indicating services that may be provided through each alternative communication technique.

In the case that the first device 200 and the second device 300 that exchange the capability information are intended to connect the Bluetooth BR/EDR, the first device 200 may transmit a handover request message that requests a connection of the BR/EDR to the second device 300 through the Bluetooth LE, and the second device 300 may transmit a handover response message to the first device 200 in response to it (step, S14020).

Later, the first device 200 and the second device 300 connected through the Bluetooth BR/EDR may exchange data through the Bluetooth BR/EDR (step, S14030).

Through such a method, a Bluetooth BR/EDR connection can be performed through the Bluetooth LE of which energy efficiency is high.

FIGS. 15 to 18 are flowcharts illustrating an example of a method for connecting an alternative communication means through the Bluetooth LE and a data format to which the present invention is applied.

Referring to FIG. 15 to FIG. 18, the first device 200 and the second device 300 may exchange service list information that indicates services that may be provided through alternative communication means information supported by each device in a connection procedure of the Bluetooth LE and the alternative communication means. Hereinafter, a method for performing a Bluetooth BR/EDR connection through the Bluetooth LE will be described as an example.

Figure 15:
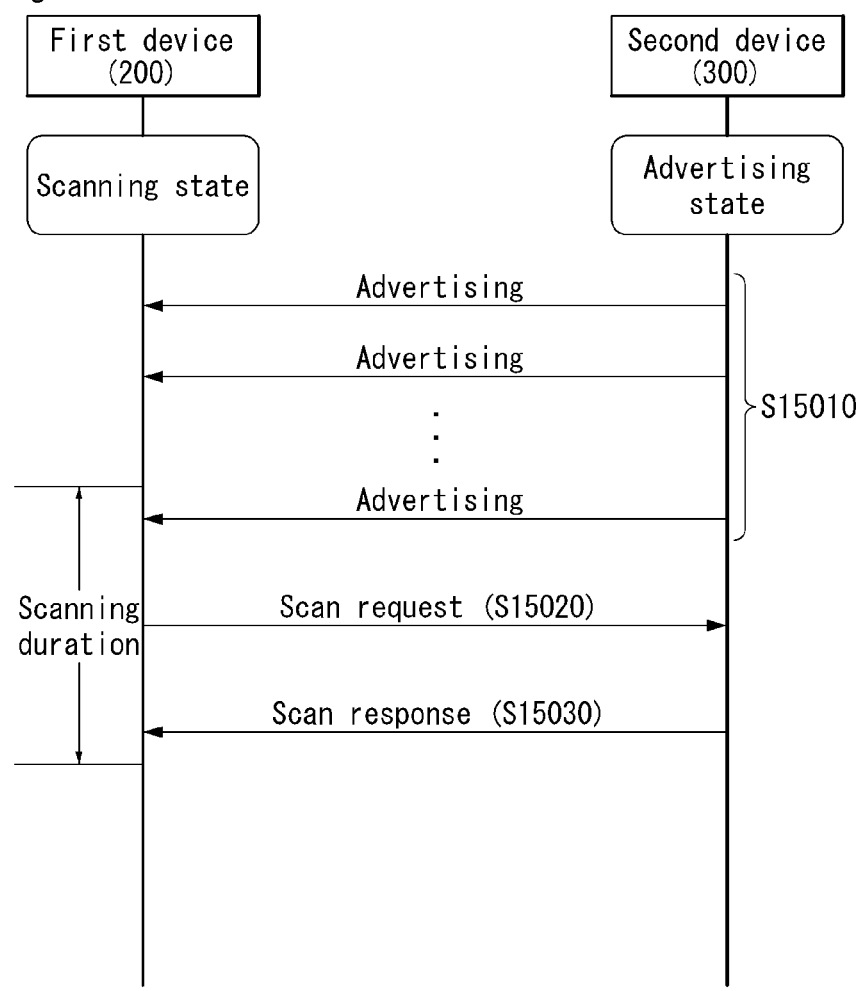

Particularly, as shown in FIG. 15, the first device 200 is existed in a scanning state for a Bluetooth LE connection and the second device is existed in an advertising state.

The second device 300 transmits an advertising message to the first device 200 in the advertising state (step, S15010). In this case, the advertising message may be transmitted to a plurality of devices through the broadcast scheme or transmitted to only a specific device through the unicast scheme as described above.

The advertising message may include alternative communication means information indicating the information of an alternative communication means supported by the second device 300 and information of a service that may be provided through the alternative communication means.

The service information may be included as service list information enumerating a plurality of services. Such alternative communication means information and service list information may be basic information enables the first device 200 to select an alternative communication means and a service that is going to be activated through GATT of the Bluetooth LE later.

Figure 16:
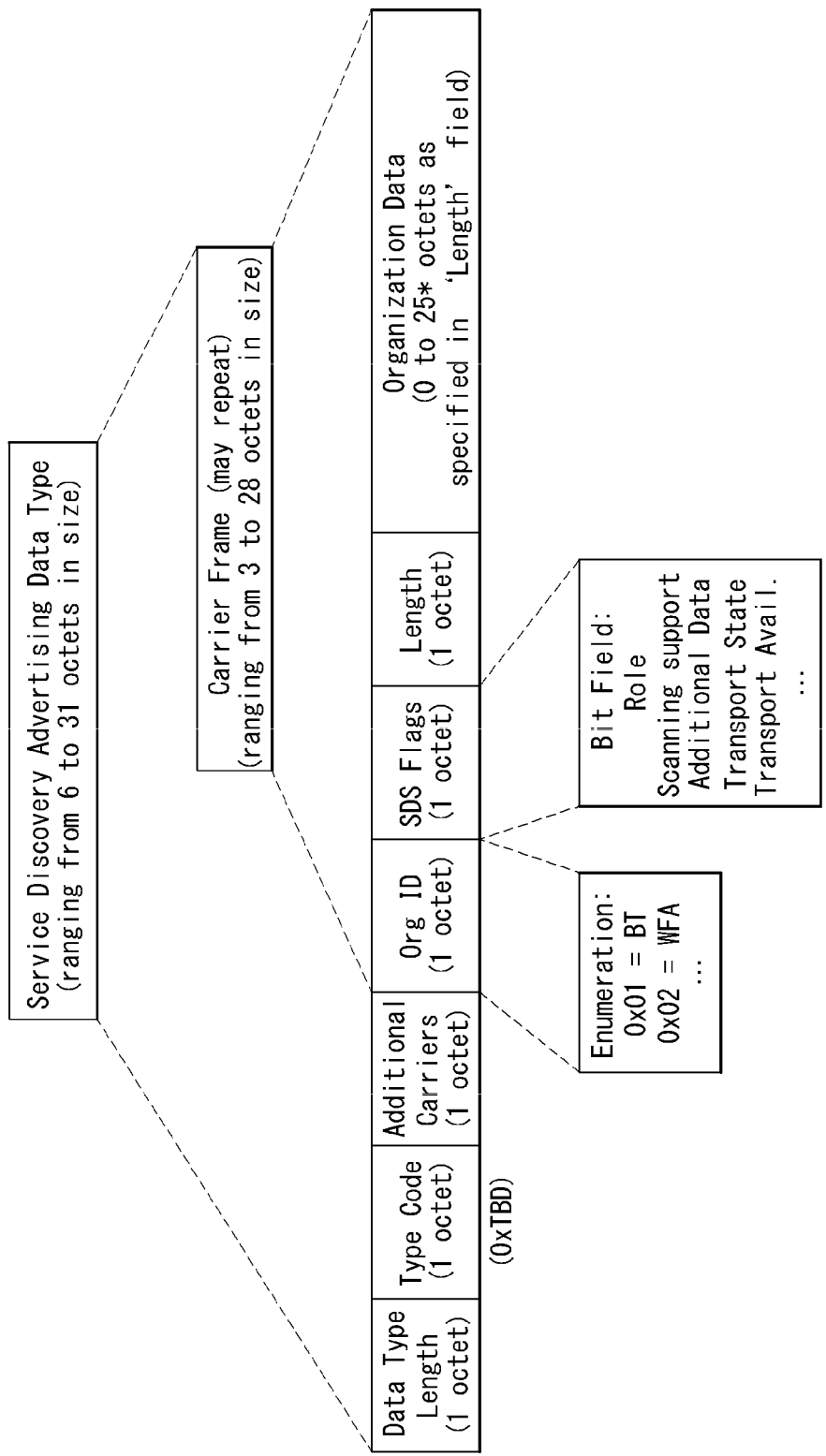

FIG. 16 and Table 2 below show an example of a data format of the advertising message.

TABLE 2

| | Service Discovery | | Carrier Frame(0 or more) | | | |
|---|---|---|---|---|---|---|
| | Data AD Type Code | Additional Carriers | Organization ID | SDS Flags | Length | Organization Data |
| Byte Order | N/A | N/A | N/A | N/A | N/A | LSO . . . MSO |
| Data Type | Unit8 | 8 bit | Unit8 | 8 bit | Unit8 | Variable |
| Size | 1 octet | 1 octet | 1 octet | 1 octet | 1 octet | 0-25 octets |

In Table 2 above, the Service Discovery Data AD Type Code field represents a service that the second device is intended to provide through the Bluetooth LE.

The Additional Carrier field represents whether information of additional carriers is included in GATT Data base.

FIG. 17 shows an example of a data format of the advertising message in the case that the second device 300 transmits the advertising message with the information of services that may be provided through Bluetooth BR/EDR support and the Bluetooth BR/EDR being included.

In the present invention, AD type of FIG. 17 may have a value as represented in Table 3 below.

TABLE 3

| Type Value | Data Type Name |
|---|---|
| 0x01 | <<Flag>> |
| 0x09 | <<Complete Local Name>> |
| 0x0D | <<Class of Device>> |
| 0x2A(TBD) | <<Service Discovery Data>> |

AD Data of FIG. 17 is a place in which a data for handover is included, and may include Supported Carrier field, Organization ID field, SDS Flags field, Length field and Organization Data field.

The Additional Carrier field is a field that includes the information of an alternative communication means supported by a device, and Bit0 representing the information of the Bluetooth BR/EDR is included may setup as '1'.

The Organization ID field is a field including an Organization ID of an alternative communication means, and the SDS Flags field may include a role of a device, state information of a device, whether an additional data is existed in GATT Database and state information of an alternative communication means.

The Organization Data field may include information in relation to a service (profile information for the Bluetooth BR/EDR) that may be provided through the alternative communication means, a time until the alternative communication means is turned on or becomes usable and/or an offset value in relation to a remaining time until a service becomes usable, sink information of A2DP, HFP information, and the like.

The first device 200 may receive an advertising message transmitted by the second device 300 in a scanning duration. The first device 200 that obtains alternative communication means information supported by the second device and information of a service that may be provided through the alternative communication means through the advertising message may transmit a scan request message to the second device 300 in the case that additional information is required (step, S15020).

Later, the first device may receive a scan request message in which additional information is included from the second device 300 (step, S15030).

The additional information may include a local name of the second device, a device class, a device type and/or a major service class.

FIG. 18 shows an example of additional information included in the scan response message, and FIG. 18(a) shows a local name of a device and FIG. 18(b) shows an example of a data type.

As such, the first device 200 may obtain the information of an alternative communication means and a service that may be provided through the alternative communication means from the second device through a Bluetooth LE connection procedure.

FIGS. 19 to 21 are flowcharts illustrating another example of a method for connecting an alternative communication means through the Bluetooth LE and a data format to which the present invention is applied.

Referring to FIG. 19 to FIG. 21, after the Bluetooth LE is connected through the Bluetooth LE procedure described in FIG. 8 above, the first device 200 may connect an alternative communication means by indicating a connection of the alternative communication means through the Bluetooth LE to the second device 300.

Particularly, the first device 200 and the second device 300 may establish a Bluetooth LE connection through the procedure described in FIG. 7 above.

Later, the first device 200 may transmit a Read Request message for an additional information request to the second device when Bit3 of the SDS Flags field of the advertising message of FIG. 15 or FIG. 16 is '1' or additional information is required (step, S19010).

The Read Request message is a message for requesting information stored in GATT Database of the second device 300.

FIG. 20 shows an example of a service and a characteristic stored in GATT Database of the second device 300.

FIG. 20(a) shows a service type for a Bluetooth BR/EDR connection through the Bluetooth LE and FIG. 20(b) shows a characteristic for providing the service shown in FIG. 20(a).

In response to the Read Request message, the first device 200 may receive the additional information requested through a Read Response message from the second device 300 (step, S19020).

Later, the first device 200 may transmit a Write Request message including control information in order to indicate turn on of the Bluetooth BR/EDR which is an alternative communication technique intended to connect with the second device 300 and an activation of a service (step, S19030).

In this case, in order to indicate turn on of the Bluetooth BR/EDR and an activation of a service through the Write Request message, the first device 200 may request a writing of "Handover Control Point" characteristic of FIG. 20(b).

The control information may include an Operation Code (Opcode) and a parameter value therefor in order to instruct a specific operation to the second device.

FIG. 21(a) shows an example of a data format of the Write Request message and FIG. 21(b) shows an example of a format of an Operation Code field.

In this case, the first device 200 may request an activation of a part or the whole of services that the second device 300 may support through the Write Request.

The first device 200 may receive a Write Response message in response to the Write Request (step, S19040).

The second device 300 may activate turn on of the Bluetooth BR/EDR which is an alternative communication technique and the service according to the instruction of the first device 200. In this case, the second device 300 may activate only a part or the whole of services instructed by the first device 200.

Later, the second device 300 is in a Bluetooth BR/EDR page scan state, and may transmit an indication message to the first device 200 (step, S19050).

In the case that the instruction of the first device 200 is successfully performed, the indication message may be transmitted from the second device 300 to the first device as an Ack.

In the case that the first device 200 requests activations of a plurality of services, since the indication message may activate only a part of the plurality of services requested, the indication message may include activation information indicating an activated service among the plurality of services.

The first device transmits a Confirmation message to the second device 300 in response to the indication message, and is switched to a BR/EDR page state (step, S19060).

Later, the first device 200 transmits a page message to the second device 300 (step, S19070), and provides a service through the Bluetooth BR/EDR.

As such, by connecting the Bluetooth BR/EDR through the Bluetooth LE which is a low power communication means, power consumption may be decreased, and a time required for a connection may be shortened.

FIGS. 18 to 21 introduce a method for connecting the Bluetooth BR/EDR through the Bluetooth LE.

However, the present invention is not limited thereto, and may be used for connecting other alternative communication means such as Wi-Fi and the like as well as the Bluetooth BR/EDR through the Bluetooth LE.

For example, through the Bluetooth LE, the second device may transmit information of a service that may be provided through Wi-Fi to the first device 200.

Through this, the first device 200 may know that the second device 300 support Wi-Fi as an alternative communication means and the service that may be provided through the Wi-Fi, and provide a service by connecting Wi-Fi with the second device 300.

Figure 22:
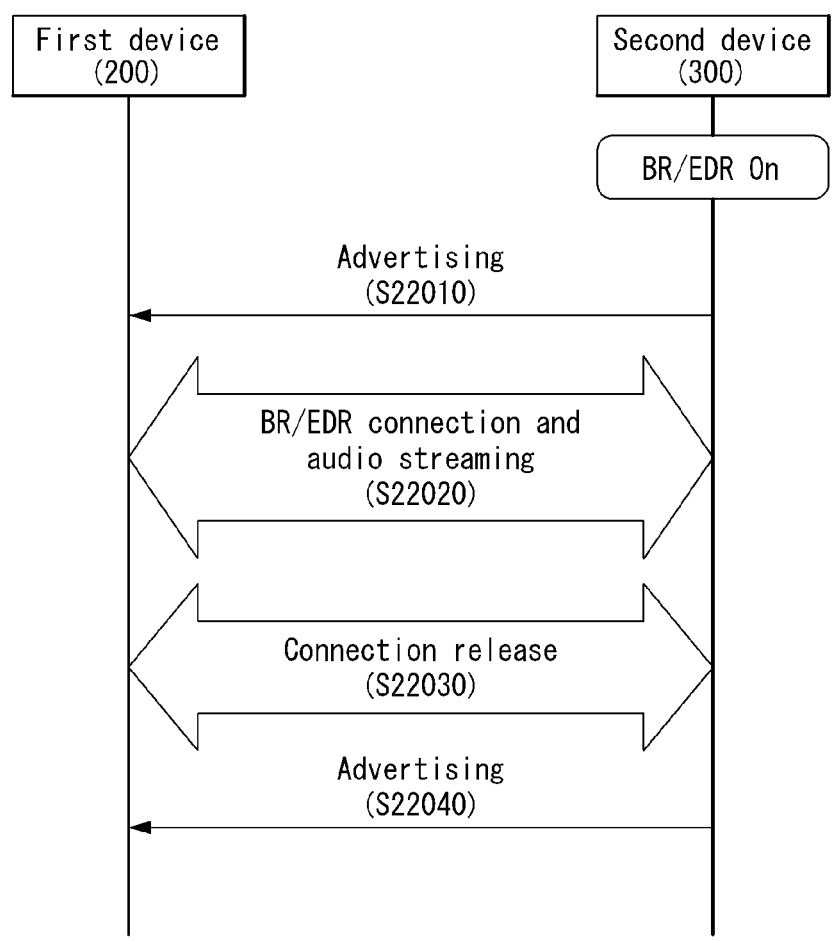
FIG. 22 is a flowchart illustrating an example of a method for providing an audio streaming service of the Bluetooth BR/EDR through the Bluetooth LE to which the present invention is applied.

FIG. 22 is a flowchart illustrating an example of a method for providing an audio streaming service of the Bluetooth BR/EDR through the Bluetooth LE to which the present invention is applied.

Referring to FIG. 22, by transmitting information in relation to a BR/EDR connection through an advertising message of the Bluetooth LE, an audio streaming service may be provided through Bluetooth BR/EDR A2DP.

First, in an embodiment of the present invention, it is assumed that a Bluetooth BR/EDR interface of the second device 300 is turned on.

The second device 300 may transmit an advertising message to neighboring devices in order to notify itself in a Bluetooth BR/EDR on state (step, S22010).

The advertising message may include state information indicating a state of the Bluetooth BR/EDR of the second device 300, service list information indicating at least one service that may be provided through the Bluetooth BR/EDR and identification information (e.g., identifier (ID), address, etc.) for identifying the second device 300.

The first device 200 that receives the advertising message may discover the second device 300, and may know a state (On or Off) of the Bluetooth BR/EDR of the second device, a service that is available to be provided (e.g., A2DP service, etc.).

The first device 200 that discovers the second device 300 may establish a Bluetooth BR/EDR connection through the method described above in FIG. 6 above, and may provide an A2DP audio streaming service through the method described above in FIG. 9 above (step, S22020).

Later, when the audio streaming is terminated, the Bluetooth BR/EDR connection between the first device 200 and the second device 300 may be released (step, S22030), and when the connection is released, the second device 300 may transmit an advertising message to neighboring devices including the first device 200 again (step, S22040).

FIG. 23 is a flowchart illustrating another example of a method for providing an audio streaming service of the Bluetooth BR/EDR through the Bluetooth LE to which the present invention is applied.

Referring to FIG. 23, different from FIG. 22, by thoroughly establish a Bluetooth LE connection, and by exchanging information for a Bluetooth BR/EDR connection through the established Bluetooth LE and information for providing an A2DP audio streaming service, a Bluetooth BR/EDR connection may be established and a service may be provided.

First, in an embodiment of the present invention, it is assumed that an initial Bluetooth BR/EDR interface of the second device 300 is turned off.

Since step S23010 is the same as step S22010 of FIG. 21, the description will be omitted.

In the case that the first device 200 is intended to establish a Bluetooth LE connection with the second device 300, the first device 200 transmits a connection request message to the second device 300 (step, S23020), and establishes a Bluetooth LE connection by synchronizing timing information and the like with the second device.

Later, the first device 200 and the second device 300 may exchange connection information for a Bluetooth BR/EDR connection through GATT and information for providing an A2DP audio streaming service.

For example, the first device 200 may transmit a Read Request message (a first request message) to the second device 300, and may request service information for providing connection information for a Bluetooth BR/EDR connection and the information for providing an A2DP audio streaming service (step, S23030).

The connection information may include the information transmitted and received in the paging procedure of the Bluetooth BR/EDR connection procedure described in FIG. 6 above. For example, it may include Frequency Hopping Sequence (FHS) information, transmission power information, and the like.

In addition, the connection information may also include channel map information indicating whether a channel map of the Bluetooth LE is also used in the Bluetooth BR/EDR, connection state information, and so on.

The service information is information for providing an audio streaming service through the A2DP, and may include codec information (e.g., SBC, MP3, AAC, ATRAC, vender specific, etc.), maximum bandwidth information, sampling rate information, AVDTP parameter (a sampling frequency of codec, a channel mode, the number of sub-bands, a size of block, a bit rate, whether to support VBR, etc.), and the like.

In this case, the first device 200 may include its own service information (first service information) in the Read Request message.

The second device 300 that receives the Read Request message may transmit a Read Response message (a first response message) with including its own service information (second service information) to the first device 200 (step, S23040).

The first device 200 and the second device 300 may determine the best audio streaming parameter (e.g., codec, etc.) through the first service information and the second service information obtained through the Read Request message and the Read Response message.

Later, the first device 200 may transmit a Write Request message (a second request message) including control information for indicating turn on of a Bluetooth BR/EDR interface and a start of an A2DP audio streaming service through a Bluetooth BR/EDR connection to the second device (step, S23050).

The Write Request message is a message requesting a writing of "Handover Control Point" characteristic described in FIG. 18 above, and may be the same format as that of FIG. 20.

Although it is not shown in FIG. 23, the second device 300 may transmit a Write Response message (a second response message) in response to the Write Request message to the first device 200.

The first device 200 may turn on the Bluetooth BR/EDR interface of the second device 200 through the Write Response message, and may provide an A2DP audio streaming service through establishing a Bluetooth BR/EDR connection (step, S23060).

Later, when the audio streaming is terminated, the Bluetooth BR/EDR connection and the Bluetooth LE connection may be released (step, S23070), and the second device 300 may transmit an advertising message to neighboring devices including the first device 200 (step, S23080).

As such, by exchanging the information for a Bluetooth BR/EDR connection and the information for providing an A2DP audio streaming service through the Bluetooth LE, the Bluetooth BR/EDR connection procedure and the procedure for providing an A2DP audio streaming service may be shortened, and the consumed power may be decreased.

FIG. 24 is a flowchart illustrating an example of a method for providing a hands-free service of the Bluetooth BR/EDR through the Bluetooth LE to which the present invention is applied.

Referring to FIG. 24, by transmitting information in relation to a BR/EDR connection through an advertising message of the Bluetooth LE, a hands-free service may be provided through the Bluetooth BR/EDR.

First, in this embodiment, it is assumed that a Bluetooth BR/EDR interface of the second device 300 is turned on.

The second device 300 may transmit an advertising message to neighboring devices in order to notify itself in a Bluetooth BR/EDR on state (step, S24010).

The advertising message may include state information indicating a state of the Bluetooth BR/EDR of the second device 300, service list information indicating at least one service that may be provided through the Bluetooth BR/EDR and identification information (e.g., identifier (ID), address, etc.) for identifying the second device 300.

The first device 200 that receives the advertising message may discover the second device 300, and may know a state (On or Off) of the Bluetooth BR/EDR of the second device, a service that is available to be provided (e.g., hands-free service, etc.).

The first device 200 that discovers the second device 300 may establish a Bluetooth BR/EDR connection through the method described above in FIG. 6 above, and may provide a hands-free service through the method described above in FIG. 10b above (step, S24020).

Later, the Bluetooth BR/EDR connection between the first device 200 and the second device 300 may be released owing to the reason that there is no transmission and reception of a packet during more than a predetermined time, and the like, and when the connection is released, the second device 300 may transmit an advertising message to neighboring devices including the first device 200 again (step, S24040).

FIG. 25 is a flowchart illustrating another example of a method for providing a hands-free service of the Bluetooth BR/EDR through the Bluetooth LE to which the present invention is applied.

Referring to FIG. 25, different from FIG. 24, by thoroughly establish a Bluetooth LE connection, and by exchanging information for a Bluetooth BR/EDR connection through the established Bluetooth LE and information for providing a hands-free service, a Bluetooth BR/EDR connection may be established and a service may be provided.

First, in an embodiment of the present invention, it is assumed that an initial Bluetooth BR/EDR interface of the second device 300 is turned off.

Since step S25010 is the same as step S24010 of FIG. 24, the description will be omitted.

In the case that the first device 200 is intended to establish a Bluetooth LE connection with the second device 300, the first device 200 transmits a connection request message to the second device 300 (step, S25020), and establishes a Bluetooth LE connection by synchronizing timing information and the like with the second device.

Later, the first device 200 and the second device 300 may exchange connection information for a Bluetooth BR/EDR connection through GATT and information for providing a hands-free service.

For example, the first device 200 may transmit a Read Request message (a first request message) to the second device 300, and may request service information for providing connection information for a Bluetooth BR/EDR connection and the information for providing a hands-free service (step, S25030).

The connection information may include the information transmitted and received in the paging procedure of the Bluetooth BR/EDR connection procedure described in FIG. 6 above. For example, it may include Frequency Hopping Sequence (FHS) information, transmission power information, and the like.

In addition, the connection information may also include channel map information indicating whether a channel map of the Bluetooth LE is also used in the Bluetooth BR/EDR, connection state information, and so on.

The service information is information for providing a hands-free service through the Bluetooth BR/EDR, and may include information (e.g., SCO connection parameter, etc.) for establishing Synchronous Connection-Oriented (SCO) link which is a link for voice communication, maximum bandwidth information, sampling rate information, a channel mode, the number of sub-bands, and so on.

In this case, the first device 200 may include its own service information (first service information) in the Read Request message.

The second device 300 that receives the Read Request message may transmit a Read Response message (a first response message) with including its own service information (second service information) to the first device 200 (step, S25040).

Later, the first device 200 may transmit a Write Request message (a second request message) including control information for indicating turn on of a Bluetooth BR/EDR interface and a start of a hands-free service through a Bluetooth BR/EDR connection to the second device (step, S25050).

The Write Request message is a message requesting a writing of "Handover Control Point" characteristic described in FIG. 20 above, and may be the same format as that of FIG. 21.

Although it is not shown in FIG. 25, the second device 300 may transmit a Write Response message (a second response message) in response to the Write Request message to the first device 200.

The first device 200 may turn on the Bluetooth BR/EDR interface of the second device 200 through the Write Response message, and may provide a hands-free service through establishing a Bluetooth BR/EDR connection and a link of a service level (step, S25060).

Later, when the hands-free service is terminated, the Bluetooth BR/EDR connection and the Bluetooth LE connection may be released (step, S25070), and the second device 300 may transmit an advertising message to neighboring devices including the first device 200 (step, S25080).

As such, by exchanging the information for a Bluetooth BR/EDR connection and the information for providing a hands-free service through the Bluetooth LE, the Bluetooth BR/EDR connection procedure and the procedure for providing a hands-free service may be shortened, and the consumed power may be decreased by maintaining a Bluetooth LE connection persistently instead of the Bluetooth BR/EDR.

FIG. 26 is a flowchart illustrating still another example of a method for providing a hands-free service of the Bluetooth BR/EDR through the Bluetooth LE to which the present invention is applied.

Referring to FIG. 26, after a Bluetooth LE connection is established, a specific message may be persistently transmitted in order not to release the established Bluetooth LE connection, and through this, even in the case that a data of a hands-free service is not transmitted and received for a certain time, the Bluetooth LE is not released.

First, since step S26010 and step S26020 are the same as step S25010 and step S25020 of FIG. 25 above, the overlapped description will be omitted.

After the second device 300 establishes a Bluetooth LE connection with the first device 200, the second device 300 may transmit a specific message to the first device 200 periodically in every predetermined time (step, S26030).

The specific message may be called Heart Beat message, and may include an address 300 of the second device.

The reason why transmitting the specific message is time synchronization between two devices may be mismatched or the connection itself may be terminated if a message is not exchanged for a specific time after the Bluetooth LE connection is established.

Accordingly, in order to prevent it, a message is transmitted and received in a predetermined time interval.

In the case that the first device 200 and the second device 300 are intended to provide a hands-free service while transmitting and receiving the Heart Beat message, for example, in the case that a call is incoming or they make a call, a hands-free service may be provided by establishing a Bluetooth BR/EDR connection (step, S26040).

Later, the call is terminated, the hands-free service is terminated, and the Bluetooth BR/EDR connection is released (step, S26050).

However, since a hands-free service is needed to be provided immediately when a call is incoming or making a call, the Bluetooth LE connection may not be released but maintained.

Accordingly, like step S25030, after the hands-free service is terminated, the Heart Beat message may be transmitted and received in a predetermined time interval as a period (step, S26060).

In this case, the time interval may be a multiple of an interval included in a connection request message used for synchronizing timing information when establishing the Bluetooth LE connection.

Through such a method, while maintaining a Bluetooth LE connection persistently, a hands-free service may be provided by connecting the Bluetooth BR/EDR when it is required.

FIG. 27 is a flowchart illustrating still another example of a method for providing a hands-free service of the Bluetooth BR/EDR through the Bluetooth LE to which the present invention is applied.

Referring to FIG. 27, it is setup a link for providing a hands-free service of the Bluetooth BR/EDR through a Bluetooth LE connection in advance, and then, a hands-free service may be provided through the setup link.

First, since step S27010 and step S27020 are the same as step S25010 and step S25020 of FIG. 25 above, the overlapped description will be omitted.

The first device 200 and the second device 300 that establish the Bluetooth LE connection may setup a link for providing a hands-free service of the Bluetooth BR/EDR by transmitting and receiving GATT messages of the Bluetooth LE (step, S27030).

That is, the first device 200 and the second device 300 may setup a link for providing a hands-free service of the Bluetooth BR/EDR by establishing the service level connection described in FIG. 10a and FIG. 10b through GATT messages of the Bluetooth LE (step, S27040).

After setup the link, the second device 300 may transmit the Heart Beat message described in FIG. 26 above to the first device 200 in a predetermined time interval as a period until providing a hands-free service.

In the case that the first device that receives the Heart Beat message periodically is intended to provide a hands-free service, the first device 200 may transmit a Write Request message including control information for indicating turn on a Bluetooth BR/EDR interface and a start of a hands-free service through a Bluetooth BR/EDR connection (step, S27050).

The Write Request message is a message requesting a writing of the "Handover Control Point" characteristic described in FIG. 20 above, and may be the same format as that of FIG. 21 above.

The first device 200 may turn on a Bluetooth BR/EDR interface of the second device 300 through the Write Request message, and may provide a hands-free service by establishing a Bluetooth BR/EDR connection (step, S26060).

In this case, since a service level connection for providing the hands-free service is already established, it may not establish a separate link for providing a hands-free service.

Later, when the hands-free service is terminated, the Bluetooth BR/EDR connection is released (step, S27070).

However, since a hands-free service is needed to be provided immediately when a call is incoming or making a call, the Bluetooth LE connection may not be released but maintained.

Accordingly, like step S27040, after the hands-free service is terminated, the Heart Beat message may be transmitted and received in a predetermined time interval as a period (step, S27080).

In this case, like FIG. 25 above, the time interval may be a multiple of an interval included in a connection request message used for synchronizing timing information when establishing the Bluetooth LE connection.

As such, by setup a link for providing a hands-free service through a Bluetooth LE connection in advance, a hands-free service may be provided immediately without a separate link establishing procedure for providing a hands-free service.

In the present invention described so far, the construction and the method of the embodiments described above are not limitedly applied, but a part or the whole of each of the embodiments may be selectively combined and constructed so as to form various modifications.

In addition, the present invention is not limited by the embodiments described above and the accompanying drawings since various substitutions, modifications and alterations of the present invention are available for those skilled in the art without departing from the inventive concept of the present invention.

INDUSTRIAL APPLICABILITY

The present specification relates to Bluetooth data transmission and reception, and more particularly, to a method and apparatus for connecting the Bluetooth BR/EDR by exchanging information for connecting the Bluetooth BR/EDR by using the Bluetooth Low Energy (LE) technique.

The invention claimed is:

1. A method for transmitting and receiving data performed by a first device, the method comprising:
receiving an advertising message for discovering a second device from the second device,
wherein the advertising message includes at least one of state information of Bluetooth basic rate (BR)/enhanced data rate (EDR), service list information related to at least one service that is available to be provided through the Bluetooth BR/EDR or identification information related to the second device;
establishing a Bluetooth Low Energy (LE) connection with the second device based on the advertising message; and
based on a specific service being received during the Bluetooth LE connection, handing over from the Bluetooth LE connection to a Bluetooth BR/EDR connection,
wherein the handing over from the Bluetooth LE connection to the Bluetooth BR/EDR connection comprises:
based on the specific service including an occurring audio streaming service or an incoming call service, transmitting a first request message requesting connection information for establishing the Bluetooth BR/EDR connection with the second device through the Bluetooth LE connection while maintaining the Bluetooth LE connection;
receiving a first response message including the connection information from the second device through the Bluetooth LE connection; and
establishing the Bluetooth BR/EDR connection for providing the specific service with the second device.

2. The method of claim 1, wherein the connection information includes at least one of frequency hopping sequence (FHS) information of the Bluetooth BR/EDR, channel map information, transport power information or connection state information.

3. The method of claim 1, wherein the specific service is one of the audio streaming service or a hands-free service corresponding to the incoming call service.

4. The method of claim 3, wherein the first request message includes first service information related to the specific service of the first device, and
wherein the response message further includes second service information in relation to the specific service of the second device.

5. The method of claim 4, wherein when the specific service is the audio streaming service, each of the first service information and the second service information includes at least one of codec information, maximum bandwidth information or sampling rate information.

6. The method of claim 4, wherein when the specific service is the hands-free service, each of the first service information and the second service information includes at least one of maximum bandwidth information or link information for a voice communication.

7. The method of claim 3, wherein when the specific service is the hands-free service, the method further comprises:
receiving a message for maintaining the Bluetooth LE connection from the second device.

8. The method of claim 1, wherein establishing the Bluetooth BR/EDR connection includes:
transmitting a second request message including control information indicating a connection of the Bluetooth BR/EDR to the second device; and
receiving a second response message in response to the second request message.

9. The method of claim 1, wherein the state information indicates one of an on state of the Bluetooth BR/EDR or an off state of the Bluetooth BD/EDR.

10. The method of claim 1, further comprising:
disconnecting at least one connection of the Bluetooth LE connection or the Bluetooth BR/EDR connection.

11. The method of claim 10, further comprising:
receiving an advertising message from the second device when both of the Bluetooth LE connection and the Bluetooth BR/EDR connection are disconnected.

12. A first device for receiving service information by using Bluetooth Low Energy (LE), the first device comprising:
a transceiver; and
a processor functionally connected with the transceiver, wherein the processor is configured to:
control the transceiver to receive an advertising message for discovering a second device from the second device,
wherein the advertising message includes at least one of state information of Bluetooth basic rate (BR)/enhanced data rate (EDR), service list information related to at least one service that is available to be provided through the Bluetooth BR/EDR or identification information related to the second device;
establish a Bluetooth LE connection with the second device based on the advertising message;
based on a specific service being received during the Bluetooth LE connection, hand over from the Bluetooth LE connection to a Bluetooth BR/EDR connection;
based on the specific service including an occurring audio streaming service or an incoming call service, control the transceiver to transmit a first request message requesting connection information for establishing the Bluetooth BR/EDR connection with the second device through the Bluetooth LE connection while maintaining the Bluetooth LE connection;
control the transceiver to receive a first response message including the connection information from the second device through the Bluetooth LE connection; and
establish the Bluetooth BR/EDR connection for providing the specific service with the second device.

* * * * *